US007996825B2

(12) United States Patent
Chakrabarti et al.

(10) Patent No.: US 7,996,825 B2
(45) Date of Patent: Aug. 9, 2011

(54) CROSS-FILE INLINING BY USING SUMMARIES AND GLOBAL WORKLIST

(75) Inventors: Dhruva Ranjan Chakrabarti, Santa Clara, CA (US); Shin-Ming Liu, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1792 days.

(21) Appl. No.: 10/699,144

(22) Filed: Oct. 31, 2003

(65) Prior Publication Data
US 2005/0097528 A1    May 5, 2005

(51) Int. Cl.
*G06F 9/45*    (2006.01)
(52) U.S. Cl. .................................................. 717/140
(58) Field of Classification Search .................. 717/140
See application file for complete search history.

(56) References Cited

U.S. PATENT DOCUMENTS

| 5,428,793 | A | | 6/1995 | Odnert et al. | |
|---|---|---|---|---|---|
| 5,555,417 | A | | 9/1996 | Odnert et al. | |
| 5,671,419 | A | * | 9/1997 | Carini et al. | 717/145 |
| 5,740,443 | A | * | 4/1998 | Carini | 717/133 |
| 5,920,723 | A | | 7/1999 | Peyton, Jr. et al. | |
| 6,195,793 | B1 | * | 2/2001 | Schmidt | 717/151 |
| 6,971,091 | B1 | * | 11/2005 | Arnold et al. | 717/145 |

OTHER PUBLICATIONS

Aggressive Inlining, Ayers et al., 1997 ACM pp. 134-145.*
Ayers et al., "Aggressive Inlining", 1997, ACM, pp. 134-145.*
Andrew Ayers, et al., "Aggressive InLining", ACM SIGPLAN Conference on Programming Language Design and Implementation (PLDI), 1997, pp. 134-145.
Andrew Ayers, et al., "Scalable Cross-Module Optimization", ACM SIGPLAN Conference on Programming Language Design and Implementation (PLDI),1998, pp. 301-312.
Pohua P. Chang, et al., "Profile-guided Automatic InLine Expansion for C Programs", 1992, Software-Practice and Experience vol. 22 (5), pp. 349-369.
J. Eugene Ball, "Predicting the Effects of Optimization on a Procedure Body", ACM SIGPLAN, 1979, pp. 214-220.
Owen Kaser, et al., "Evaluating InLining Techniques", Aug. 14, 1996, pp. 1-15.
Matthew Arnold, et al.; "A Comparative Study of Static and Profile-Based Heuristics for InLining", ACM, 2000, pp. 52-64.
Peng Zhao, et al., "To InLine or Not to Inline? Enhanced InLining Decisions", to appear at the 16th Workshop on Language and Compilers for Parallel Computing (LCPC03), Oct. 2003.
Toshio Suganuma, et al., "An Empirical Study of Method InLining for a Java Just-In-Time Compiler", Proceedings of the 2nd Java Virtual Machine Research and Technology Symposium, Aug. 2002.

* cited by examiner

*Primary Examiner* — Wei Zhen
*Assistant Examiner* — Junchun Wu

(57) ABSTRACT

One embodiment disclosed relates to a method of compiling a computer program. A plurality of modules of source code is received, and intermediate representations corresponding to the modules are generated. A set of data from the intermediate representations is extracted to create an inliner summary for each module. Using the inliner summaries and a globally-sorted working-list based order, an inline analysis phase determines which call sites in the modules are to be inlined by substituting code from a called module. The propagation of summaries may be done elaborately, potentially throughout the call-graph. The goodness of call sites may be computed with a view to comparing them and ordering them in a descending order of goodness. Applicants believe the compile-time effectiveness lies in the ability to work consistently with summary information in the inline analysis phase without having to touch the intermediate representation, while maintaining a high degree of run-time performance by continuously updating the summary information.

19 Claims, 15 Drawing Sheets

```
main()              foo()              bar()              foobar()          test1
{                   {                  {                  {                 { }
  foo();              foobar();          foobar();          test1();        test2
  bar();            }                  }                    test2();        { }
}                                                           test3();        test3
                                                          }                 { }
```

Figure 2A
(Background Art)

CROSS-FILE INLINING BY USING SUMMARIES AND GLOBAL WORKLIST

BACKGROUND OF THE INVENTION

1. Field of the Invention

The present invention relates generally to computer software and more particularly to software compilers.

2. Description of the Background Art

At present, there are two common steps involved in constructing an application that will run on a computer. The first step is the compilation phase that accomplishes a translation of the source code to a set of object files written in machine language. The second step is the link phase that combines the set of object files into an executable object code file.

Today, most modern programming languages support the concept of separate compilation, wherein a single computer source code listing is broken up into separate modules that can be fed individually to the language translator that generates the machine code. This separation action allows better management of the program's source code and allows faster compilation of the program.

The use of modules during the compilation process enables substantial savings in required memory in the computer on which the compiler executes. However, such use limits the level of application performance achieved by the compiler. For instance, optimization actions that are taken by a compiler are generally restricted to procedures contained within a module, with the module barrier limiting the access of the compiler to other procedures in other modules. This limitation is of significance when attempting to accomplish inlining. Inlining replaces a call site with the called routine's code. In-line substitution eliminates call overhead and tailors the call to the particular set of arguments passed at a given call site. It increases the context for subsequent scalar optimizations and instruction scheduling, thus improving run-time performance in general. Cross-module inlining is a technique to substitute a call site by the called routine's code even when the call site and the called routine reside in different modules.

The modular handling of routines by the compiler creates a barrier across which information, which could be of use to the compiler, is invisible. It has been recognized in the prior art that making cross-modular information available during the compilation action will improve application performance. Thus, a compiler that can see across modular barriers (a cross-module optimizing compiler) can achieve significant benefits of inter-procedural optimization and achieve noticeable gains in performance of the resulting application. There has been prior work showing the run-time performance potential of cross-file optimizations. For example, "Scalable. Cross-Module Optimization", described by A. Ayers, S. de Jong, J. Peyton, and R. Schooler, reports performance speedups of as much as 71%. "Aggressive inlining", described by A. Ayers, R. Gottlieb, and R. Schooler, reports significant performance speedups by performing cross-file inlining.

SUMMARY

One embodiment of the invention relates to a method of compiling a computer program. A plurality of modules of source code are received, and intermediate representations corresponding to the modules are generated. A set of data from the intermediate representations is extracted to create an inliner summary for each module. Using the inliner summaries and a globally-sorted working-list based order, an inline analysis phase determines which call sites in the modules are to be inlined by substituting code from a called module.

Another embodiment of the invention relates to an apparatus for compiling a computer program. The apparatus includes at least a front-end units and a cross-module optimizer. The front-end unit is configured to receive a plurality of modules of source code, generate intermediate representations corresponding to the modules, and extract a set of data from the intermediate representations to generate inliner summaries for the modules. The cross-module optimizer is configured to use the inliner summaries and a globally-sorted working-list based order in an inline analysis phase so as to determine which call sites in the modules are to be inlined by substituting code from a called module.

Another embodiment of the invention relates to a computer program product. The product comprises a computer-usable medium having computer-readable code embodied therein and is compiled from a plurality of modules of source code. The compilation uses inliner summaries and a globally-sorted working-list based order in an inline analysis phase to determine which call sites in the modules are to be inlined by substituting code from a called module.

In accordance with an embodiment of the invention, the intermediate representation is never used by the inline analyzer. The inline analyzer uses summary information alone. The effect of an inline is captured by updating summaries after each and every inline. The propagation of summaries is done elaborately, potentially throughout the call-graph. Existing state-of-the-art frameworks lack proper updation when summaries are used. A formal method is devised to compute the goodness of call sites with a view to comparing them and ordering them in a descending order of goodness. The novelty of computing the goodness lies in its derivation from the summary information alone, unlike existing schemes. The compile-time effectiveness of our invention lies in the ability to work consistently with summary information in the inline analysis phase without having to touch the intermediate representation, while maintaining a high degree of run-time performance by continuously updating the summary information. One particular embodiment of the invention lies in the use of a global worklist approach wherein all the call sites are examined in order depending on their goodness factors. Applicants believe this is a novel approach not employed hitherto by any other scheme. Unlike often used bottom-up and top-down approaches, this novel framework has the potential to obtain the best run-time performance.

BRIEF DESCRIPTION OF THE DRAWINGS

FIG. 2A shows various modules for an illustrative example program.

DETAILED DESCRIPTION

General Concepts

The following are some acronyms and standard terms used throughout the description.

ID: A unique integer identifier
IR: Intermediate representation of a program
In-core: In main memory
CG: Call graph
FE: Front End
IPO: Inter-Procedural Optimization
CMO: Cross-Module Optimization
BE: Back End of a compiler
CFG: Control flow graph
SPEC2000: SPEC CPU 2000 benchmark
Module: Equivalent of a source file Prior cross-module optimization techniques are typically inefficient and result in disadvantageously long compile times. The contribution of the present application relates to the area of cross-file inlining, so we will now describe some pitfalls in the design and implementation of a cross-file inliner.

When dealing with large applications consisting of thousands of files, the entire IR size becomes huge. Hence, performing analyses directly on the IR requires a large amount of time and memory making the process prohibitive. One solution is to use summary information instead of the whole IR whenever possible. An example of an effort that uses summaries is the Pro64 Open Source Compiler from Silicon Graphics, Inc. of Mountain View, Calif. However, the use of summaries comes with its own share of problems. The choice of information and their representation in summaries needs to be made carefully. This is because the space allowed for summaries is limited and the summary information needs to allow efficient retrieval of data. Since the summary information, instead of the actual IR, is used by all the analyses, continuous update of the summaries is necessary as decisions are taken by various optimizing phases. This is of significant importance since an optimizing decision needs to take into account changes effected by previous decisions. One embodiment of our invention involves updating summaries globally as inline decisions are taken by the analyzer.

A particular concern about compile-time scalability lies in the design and implementation of the cross-file inliner. Even modern computer systems have a limitation on the amount of memory and the number of open files usable by a computer process. When inlining needs to take place across thousands and thousands of files, a situation arises when open files need to be closed in order to open other necessary files. This can lead to thrashing as the computer process spends most of its time opening and closing files instead of performing the actual task of optimizing. A significant effort in handling this problem is described by "Scalable Cross-Module Optimization," wherein files are offloaded transparently as and when required. However, this work does not take into account the intelligence that can be derived from a particular optimizing phase. For instance, state-of-the-art schemes naively follow a certain predefined inline order (such as bottom-up order which is predefined by the call-graph structure), opening and closing files as and when required.

Figure 1A:
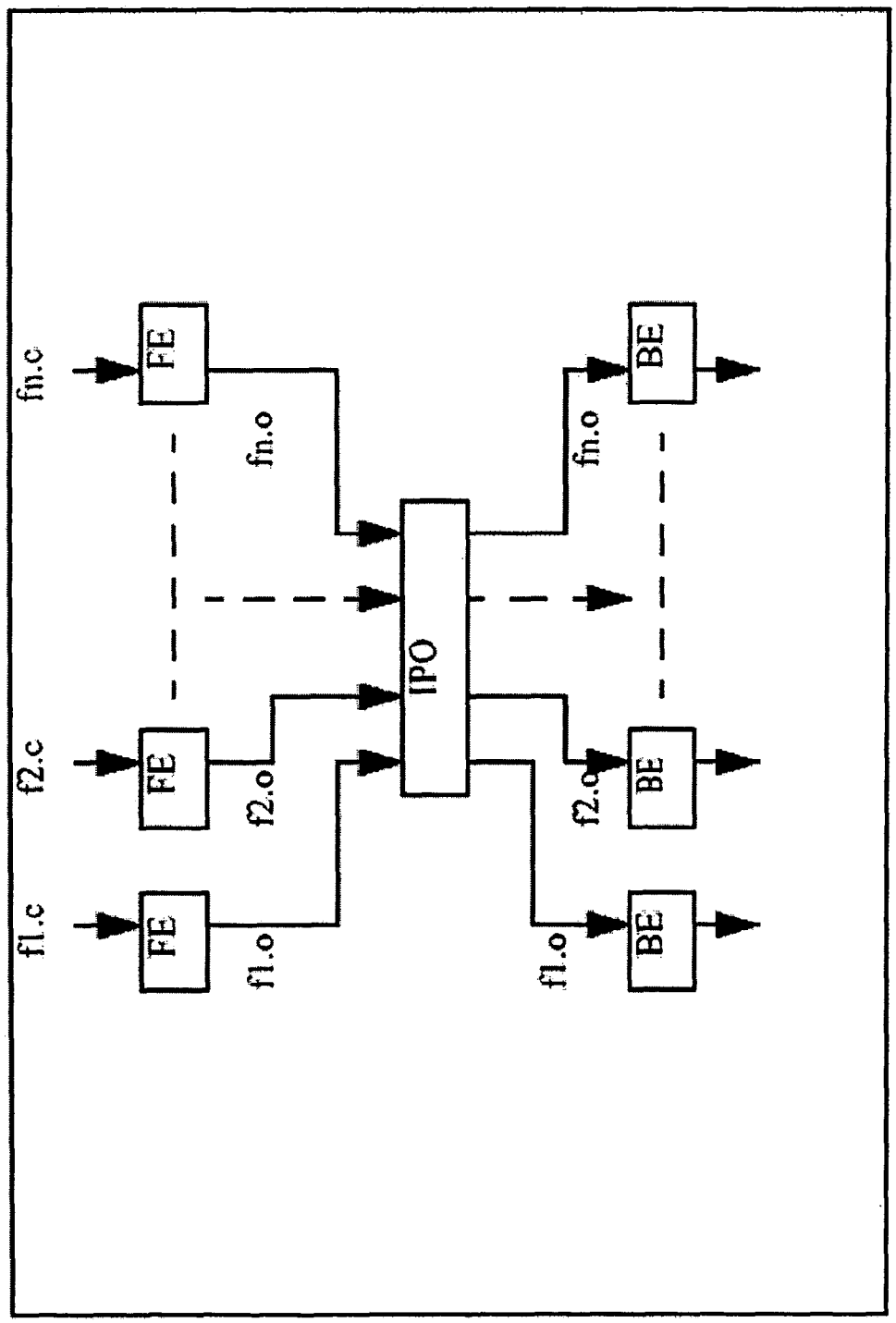
FIG. 1A is a schematic diagram illustrating an apparatus including a cross-module optimizer in accordance with an embodiment of the invention.

The present application describes an elaborate framework to obtain dynamically an inline transformation order by exploiting the inherent locality among cross-file inlines. Equipped with knowledge about the inlines requiring completion, the relationship among the inlines, and the affinity among files defined by cross-file inlines, our framework makes intelligent decisions regarding writing, opening, and closing of files. Thus, by manipulating the inline transformation order on the fly, our scheme is able to achieve compile-time much better than state-of-the-art techniques. FIG. 1A is a schematic diagram illustrating an apparatus including a cross-module optimizing compiler. There is a front-end (FE) portion that receives each source file (f1.c, f2.c, f3.c, ..., fn.c) of the program. The FE component accepts the input program and writes out an intermediate representation of the program. The outputs of the FE components are fed to the inter-procedural optimizer (IPO). The IPO may also be called the cross-module optimizer (CMO). The IPO performs cross-file optimizations and writes out optimized intermediate representations for each source file in the user program. The back-end (BE) portion accepts the output of the IPO phase, generates the object files (f1.o, f2.o, f3.o, ..., fn.o), and performs low-level optimizations.

In accordance with an embodiment of the invention, the FE is also configured to collect pertinent data for the inliner summaries. These are initial summaries and may be updated by later phases, both in the IPO and the BE stages. These are persistent because they are written out to files along with the intermediate representation. Subsequent phases may build and maintain in-memory summaries for optimizations specific to those phases.

Figure 1B:
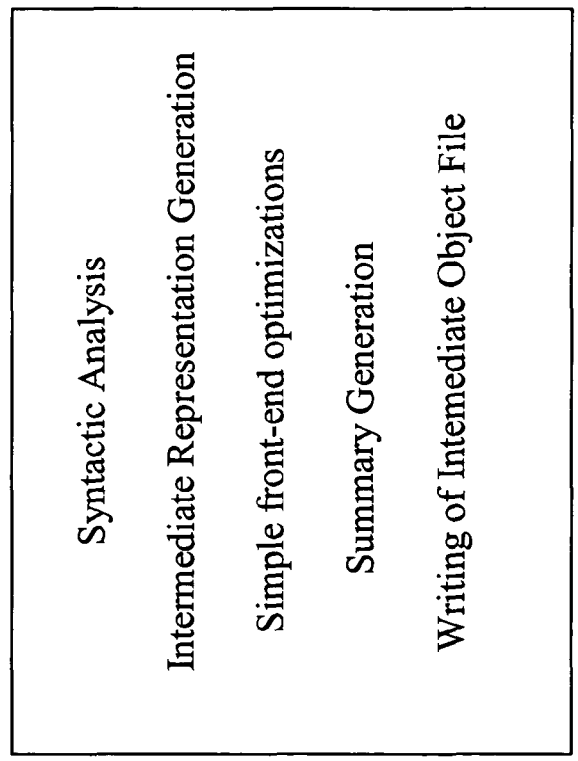
FIG. 1B is a schematic diagram giving an overview of functions performed by a front-end portion of a cross-module optimizer in accordance with an embodiment of the invention.
Figure 1C:
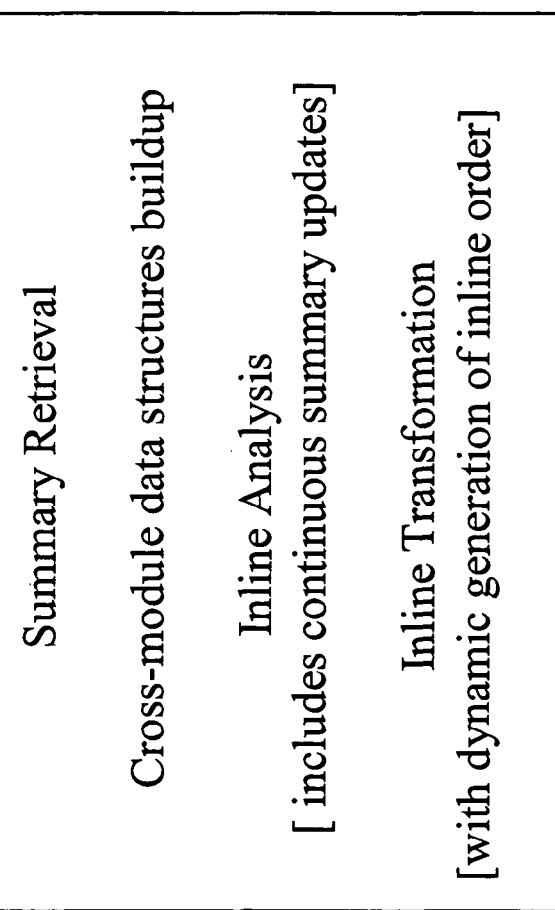
FIG. 1C is a schematic diagram giving an overview of functions performed by an inter-procedural optimizer of a cross-module optimizer in accordance with an embodiment of the invention.

FIGS. 1B and 1C expand upon the operation of, respectively, the FE and the IPO components of FIG. 1A. FIG. 1B gives an overview of functions performed by the FE component. FIG. 1C gives an overview of functions performed by the IPO component.

FIG. 2A shows various routines or functions for an example program. The example program is made up for illustrative purposes only and has been simplified to show only the call sites. The example program has a root routine named main( ). main( ) includes calls to two other routines, foo( ) and bar( ). foo( ) includes a call to foobar( ). bar( ) also includes a call to routine, foobar( ). foobar( ) includes calls to three other routines, test1( ), test2( ), and test3( ). The call sites test1( ), test2( ), and test3( ) do not have any calls.

Figure 2B:
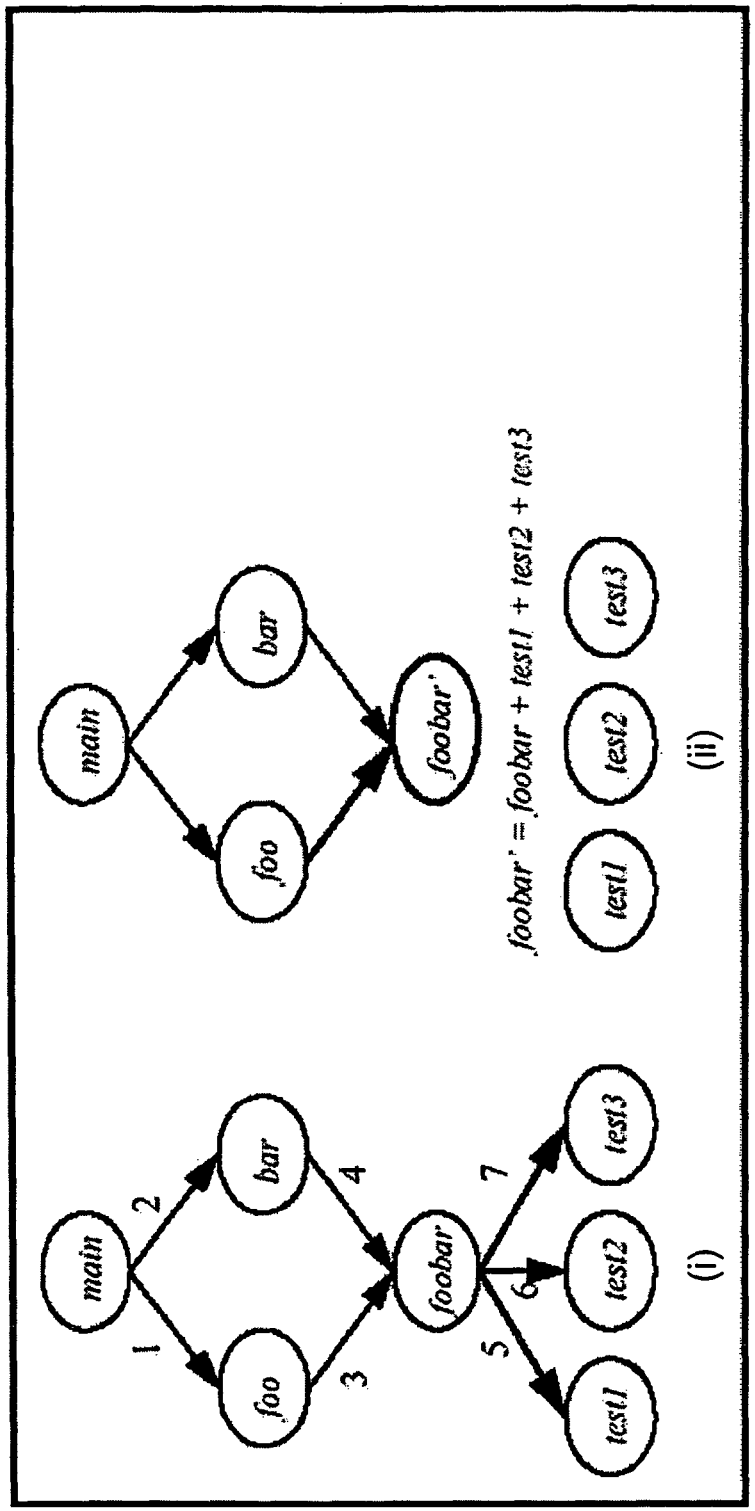
FIG. 2B (i) shows a call graph including the routines and call sites from the example in FIG. 2A, and FIG. 2B (ii) shows the call graph after three call sites therein have been inlined.

FIG. 2B (i) shows a call graph including the routines and call sites from the example in FIG. 2A. The nodes of the call graph correspond to the program routines, and the edges of the call graph correspond to the call sites. The call site labeled "1" corresponds to the call from main( ) to foo( ). The call site labeled "2" corresponds to the call from main( ) to bar( ). The call site labeled "3" corresponds to the call from foo( ) to foobar( ). The call site labeled "4" corresponds to the call from bar( ) to foobar( ). The call sites labeled "5", "6", and "7" correspond to the calls from foobar( ) to test1( ), test2( ), and test3( ), respectively.

FIG. 2B (ii) shows the call graph after the call sites labeled "5", "6", and "7" have been inlined. In other words, the call from foobar( ) to test1( ) has been replaced with code from test1( ), the call from foobar( ) to test2( ) has been replaced with code from test2( ), and the call from foobar( ) to test3( ) has been replaced with code from test3( ). After inlining, foobar( ) is labeled foobar'( ).

Figure 3:
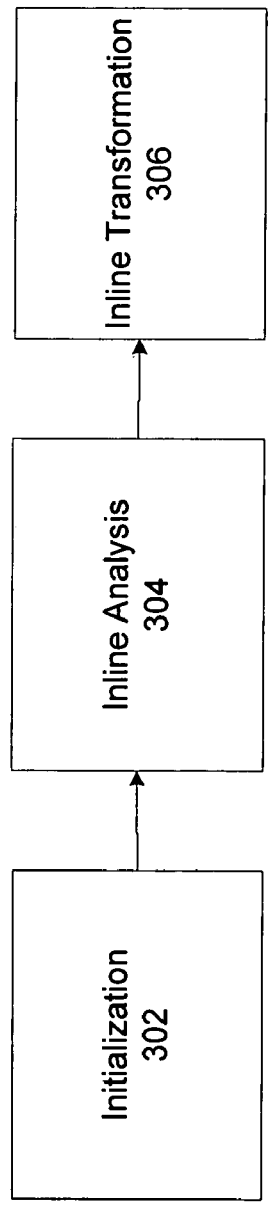
FIG. 3 is a flow chart depicting a method for inlining during compilation of a program in accordance with an embodiment of the invention.

FIG. 3 is a flow chart depicting a method for inlining during compilation of a program in accordance with an embodiment of the invention. The method shown includes an initialization or front-end phase 302, followed by an inline analysis phase 304, followed by an inline transformation phase 306.

A prior publication, "Aggressive Inlining," by Andrew Ayers, Richard Schooler, and Robert Gottlieb, Conference on Programming Language Design and Implementation (PLDI), 1997, describes a multi-pass inliner, as outlined below.

Loop through the following N times (where N is a tunable parameter)

Perform inline analysis with x % budget (where x is a tunable parameter) using in-memory summaries. A certain percentage of the total budget is allowed in a certain pass. The inline analysis phase accepts a call site for inlining if the values of the entities in the summary information are within predefined thresholds. The result of this phase is a set of call sites that have been accepted for inlining.

A profit value and a cost value are assigned to each of the call sites that have been accepted for inlining. A goodness factor, based on the cost and the profit, is computed. Based on this goodness factor, the call sites are sorted in decreasing order to form a working list.

Perform inline transformation of the call sites from the working list in order of decreasing goodness.

Perform scalar optimizations.

Recompute in-core summaries for routines and call sites directly from the intermediate representation (IR).

The above inliner is thus comprised of multiple phases of inline analysis, inline transformation, scalar optimizations on the modified routines, and recomputation of in-core summary information. By varying the granularity of the pass and the number of iterations, the scheme tries to capture the effects of inlining with reasonable accuracy. However, while this scheme captures the final run-time picture quite well, it can lead to long compilation times. Applicants believe that this scheme may have disadvantages in regards to the following.

Since scalar optimizations are explicitly executed, the whole intermediate representation needs to be in memory. Thus, this eliminates the possibility of working on summary information. For a large application with lots of files, the compilation uses a lot of memory without any scalability.

Multiple iterations over an inlining and scalar optimization pass lead to long compilation times.

The order in which this scheme performs the inlines is interesting. In every pass, the call sites are first examined in a bottom-up order. However, once call sites are accepted for inlining in a certain pass, they are added to a working list. Thus, division of the inliner into multiple passes results in a partition of the call-graph and every pass works on a certain partition. Within a certain partition, the call sites are sorted on a goodness factor to create an ordered working list. Since the working list is created within a certain partition, this scheme achieves an inline order that is neither bottom-up nor working list. This is because a proper working list order would consider the call-graph as an entity without dividing it into partitions.

Since no updation of state is performed between inline decisions in a certain phase, the goodness factor is ill-formed. Consider the following call chain: a calls b, b calls c, c calls d. At the start of the inline analysis phase, the inliner computes in-core summary information for each of these 3 call sites. Consider that the inline analysis phase in a certain pass decides to inline all of these 3 call sites. It now puts all the 3 call sites in a working list and sorts them on the basis of the goodness factors that were computed at the start. This is sub-optimal since the goodness factor, of the call sites not yet examined, can potentially change after every decision to inline a call site. Unless this is taken into consideration, the sorted list is not well-formed and may well lead to sub-optimal run-time performance.

For a large application, the granularity of a phase is usually in the order of hundreds of inlines. This means that the effects of inlines are registered only after hundreds of inlines. This leads to sub-optimal decisions. For optimal decisions, there needs to be a method to capture the effect of an inline before the next call site is examined.

By mixing the inline analysis and the transformation phase (along with scalar optimizations), there is no clean separation between phases. This leads to unclean designs and non-intuitive dependencies between phases and poses a maintainability and debuggability problem.

We now describe the inliner framework that we have developed, and we describe various embodiments of our invention that solve compile-time and run-time problems.

In accordance with one embodiment of the invention, the inline analysis phase 304 is made distinct and separate from the inline transformation phase 306. In other words, a clean separation is made between the two phases. The inline analyzer produces a set of data structures for the inline transformer. A top-level driver destroys the analyzer data structures before invoking the transformer.

Figure 4:
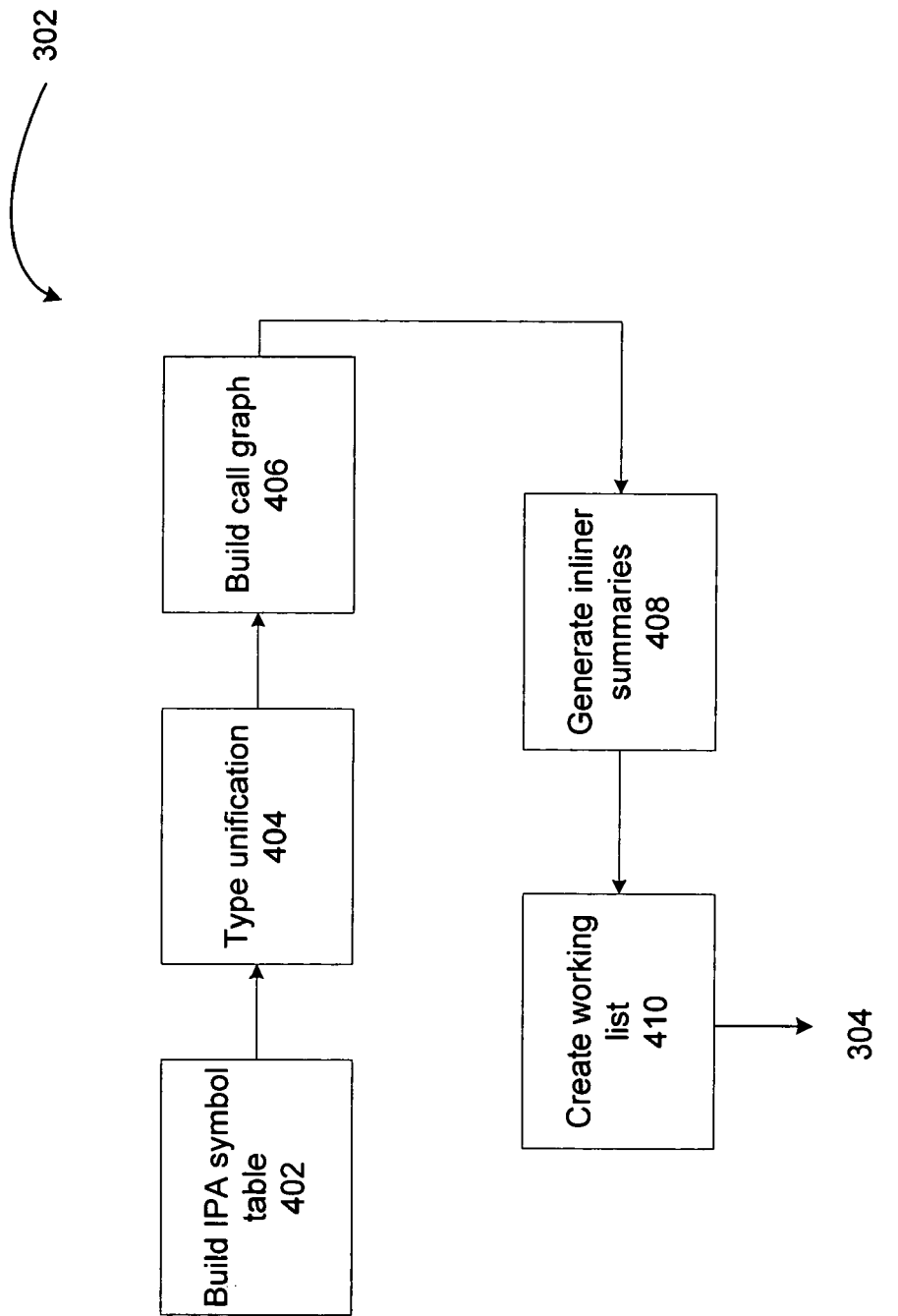
FIG. 4 is a flow chart depicting various preliminary tasks in an initialization phase in accordance with an embodiment of the invention.

FIG. 4 is a flow chart depicting various preliminary tasks in the front-end phase 302 in accordance with an embodiment of the invention. In accordance with this embodiment, these tasks include building an inter-procedural analysis (IPA) symbol table 402, type unification 404, building a call graph 406, generating inliner summaries 408, and creating a working list 410.

The IPA symbol table routine builds 402 global program-wide symbol tables by merging symbols from different files along with information obtained from the linker. For the purpose of the inliner, routine declarations and definitions need to be matched and merged in the IPA symbol table. This enables the inliner to obtain the correct definition of a routine when the call site and the routine definition reside in different files. The IPA symbol table also provides utilities to match and merge other global symbols including constants, code location information, types, and so on.

The type unifier unifies (matches and merges) 404 the types. Given the type of a datum, the inliner queries the type unifier to obtain the unified complete type. If necessary, the type unifier, as a result of queries from the inliner, imports new types into a file.

A call-graph building routine builds 406 the call graph prior to the inline analysis phase. A node in the call-graph denotes the definition of a routine. An edge in the call-graph from node A to node B denotes a call site in routine A with a call to routine B. A node in the call-graph maintains the ID of the corresponding routine definition. An edge in the call-graph maintains the ID of the actual call site. There may be multiple calls from a node A to a node B, so there can be multiple call-graph edges between two nodes. The call-graph summarizes the calling relationship between the routines in a program and thus forms the basis of the inline analysis and transformations.

Summary Information

An inliner summary generator generates 408 inliner summaries by associating summary information to nodes and edges in the call graph. The summary information captures the data and attributes of routines and call sites that enable appropriate analyses and decisions on the part of the legality and profitability analysis phases of the inliner. The front-end phase writes out persistent summaries into files. This process is quite fast since it happens in parallel for multiple input files. In-memory summaries specific to the inline optimization are generated from the persistent summary present in the intermediate object files. The following is a description of the persistent summaries that are utilized by the inliner.

The following persistent summary information is maintained for every entry in a routine.

Entry ID denoting an entry of a routine

Instruction count denoting an estimate of the code size of the routine in terms of instructions.

Register stack pressure denoting an estimate of the register stack pressure in the routine.

Data cache pressure denoting an estimate of the data cache pressure in the routine.

Entry Count denoting the number of times the entry is called.

Entry count kind denoting the kind of entry count. This kind could be inferred by the compiler or dynamically obtained from a previous run of the program.

Number of basic blocks in the control flow graph of the routine.

Number of edges in the control flow graph of the routine.

Execution time denoting an estimate of the time a routine takes to execute.

In a certain routine, the following persistent summary information is maintained for every call site.

An Expression ID denoting the call site.

A Call Info ID denoting various attributes and information about the call site.

Entry ID identifying the entry of the callee routine that is called by the call site. A routine can have multiple entries, so maintaining the identification of the entry allows us to properly represent calls to multiple entry routines.

Execution count of the call site. The execution count denotes the total count of execution of the call site. This value is computed by a previous profile annotation phase that either obtains this value from dynamic profile data or from static heuristics applied on the program structure. This value denotes the hotness of a certain call site (or call-graph edge) from the standpoint of execution frequencies.

IsInCriticalPath denoting whether this call site is in the critical path of the routine.

In the IPO phase, in-core summaries are computed for routines and call sites directly from the persistent summaries and the symbol table. The code stream is not opened or traversed. When an ID is provided to the symbol table utility routines, all of the information associated with that ID is made available to the client. For instance, querying the symbol table with a call info ID makes available to the client all of the information present in the call info symbol table. The in-core summaries, built out of the persistent summary information and the symbol table, are now described.

Routine or call-graph node summaries:

File ID: In order to generate the in-core summaries in the IPO phase, the symbol table and the persistent summaries are opened one file at a time. A file is opened, all the processing on this file is done, and then it is closed before opening the next one. We obtain the file ID corresponding to the currently opened file and add it to the node summaries. This is a piece of information required during the inline transformation process for actual IR cloning as well as call site ordering.

Compilation ID: In our intermediate representation, there can be multiple compilation units in a file. In order to generate the in-core summaries in the IPO phase, the symbol table and the summaries are traversed one compilation unit at a time. A compilation unit is opened, all the processing on this unit is done, and then it is closed before opening the next one. We obtain the compilation ID corresponding to the currently opened unit and add it to the node summaries. This information is required during the inline transformation process for actual IR cloning.

Routine ID: The persistent summary is written out for every routine. The persistent summaries are retrieved routine by routine. The routine ID is present followed by the summary information for that routine in the persistent summary database. This routine ID is copied directly into the in-core summaries. This information is required during the inline transformation process for actual IR cloning.

Entry ID: The persistent summaries are written out for every entry in a routine and they are retrieved one by one. Similar to the routine ID, the entry ID is a part of the persistent summary and hence is directly copied to the in-core summary data. This information is required during the inline transformation process for actual IR cloning.

Signature ID: Given the symbol table and an entry ID, all information corresponding to the entry is available. The signature ID is obtained from the entry information. The signature type identifies the types of the parameters that are used at the call site. The signature type is used in order to determine the legality of inlining this call site.

Routine level options: When an inline is performed, some options for the caller and the callee routine either need to be matching or compatible in order for the inline to proceed. Thus these options need to be maintained in the in-core summary information. Given a routine ID and the symbol table, all of the information regarding the routine is made available to the client making the query. The options are obtained from this information and added to the in-core node summaries.

Instruction count: This is obtained directly from the persistent summary for the corresponding routine. This gives an idea of the size of the routine and is used to infer the instruction cache pressure.

Entry count: This is obtained directly from the persistent summary for the corresponding routine. This is used by both the inline analysis and the transformation phases.

Entry count kind: This is obtained directly from the persistent summary for the corresponding routine.

Height: This denotes the height of the routine (or call-graph node) in the call-graph. The leaves of the call-graph have a height of 0. The height of a node is defined as 1 greater than the largest height among its callee routines (excluding itself, if present among its callees). The height of a routine is used in the inline analysis phase. The height indicates how deep the call chain is. Usually, a lower value of the height indicates higher chances of profitability if the corresponding call site is inlined.

Register Stack Engine (RSE) overhead: This is obtained directly from the persistent summary for the corresponding routine. A high Rse pressure indicates that the benefits of inlining may get offset by the penalty suffered by spills from register to memory and restores from memory to register.

Dcache pressure: This is obtained directly from the persistent summary for the corresponding routine. A high Dcache pressure indicates that the benefits of inlining may get offset by data cache misses.

Number of basic blocks or CFG nodes: The total number of basic blocks is maintained as a part of the summary information of a routine. This is obtained directly from the persistent summaries.

Number of CFG edges: The total number of edges in the control flow graph is maintained as a part of the summary information of a routine. This is obtained directly from the persistent summaries. The ratio of the number of CFG edges and CFG nodes of a routine gives an indication of the prevalence of branches in the routine.

Execution time: This is an estimate of the execution time of a routine and is derived by normalizing the values obtained from the persistent summaries in the context of a call-graph and call execution counts.

Call site or call-graph edge summaries:

Compilation ID: In our intermediate representation, there can be multiple compilation units in a file. In order to generate the in-core summaries in the IPO phase, the symbol table and the summaries are traversed one compilation unit at a time. A compilation unit is opened, all the processing on this unit is done, and then it is closed before opening the next one. The compilation ID of the call site is obtained directly from the one that is being processed.

Call site ID. This is obtained directly from the persistent summary information for this call site.

Execution Count: This is obtained directly from the persistent summary information for this call site.

Standard deviation: The classical standard deviation is computed for all call sites the inliner considers. In the IPO phase, the call-graph for the program under consideration is present and the execution counts of each of the call sites are known. The standard deviation is computed from this information.

IsInCriticalPath: This is a Boolean value indicating whether this call site is in the critical path of the routine. This is obtained directly from the persistent summary information for this call site.

There are various in-core summary information data that are computed in the IPO phase for the program as a whole. These various summary information data do not correspond to a certain routine or a call site but instead denote some characteristics of the program. Examples of such summary information data are described below.

Call site frequency distribution: The distribution of the frequencies of the call sites (or the call-graph edges) affects the aggressiveness of the inliner. If the distribution is uniform, it indicates that a large percentage of the call sites are hot and the inliner needs to distinguish among these call sites by utilizing other factors. If the distribution has spikes, it indicates that a small percentage of the call sites are hot and they should be considered aggressively.

Total sizes of the routines in the call-graph: The in-core summaries maintain the code sizes of individual routines. Since the IPO phase has these summaries available for all routines, the total size of the routines is easily computed. This gives an idea of the instruction cache footprint and hence of the instruction cache pressure. The aggressiveness of the inliner changes depending on the range in which this value resides.

Inline Analysis Order

Having described the generation and the relationship between the persistent and the in-core summaries, we will now describe the order in which the call sites are examined for inline analysis. One embodiment of the invention lies in the use of a working list. The working list generator generates 410 a working list for use in the inline analysis phase. The working list defines the initial order in which the call sites be examined for possible inlines. Every call site is assigned a goodness factor which is a measure of the net benefit of inlining that call site.

Other inline analysis orders may be used besides the working list approach. A bottom-up ordering starts from the "leaves" of the call graph and moves towards the "root" of the call graph. Using a bottom-up ordering, the analysis tries to infer whether it is profitable to inline a given callee routine into one or more of its caller routines. A top-down ordering starts from the root and works its way down towards the leaves of the call-graph. Using a top-down ordering, the analysis tries to infer whether it is profitable to inline one or more callee routines into a given caller routine. In contrast, the working-list ordering orders the call sites on the basis of a goodness-factor. Using this approach, call sites are examined for inlining in the order determined by the goodness factor. The higher the goodness factor, the earlier it is examined for inlining. Thus, this ordering is not strictly based on the shape of the call-graph. One embodiment of the invention relates to advantageously using a working list ordering in conjunction with inliner summaries in the inline analysis phase.

There are potentially a number of problems associated with using the various inline ordering approaches. These problems are discussed below.

First, there is a local minima problem. This problem exists in the bottom-up and top-down inline analysis orders. In order to understand this problem, consider the example program illustrated in FIG. 2A with associated call graph shown in FIG. 2B. Let us consider bottom-up inline analysis order for the call-graph shown in FIG. 2B. The bottom-up ordering will examine the call sites 5, 6, and 7 in some arbitrary order (some schemes assign a profit factor to the call sites at the same level and examine them in a descending order). While examining a call graph edge, a decision is taken based on the profitability of that call site assuming it is legal to inline that call-graph edge. In our example, let us assume the following values for the various call sites.

| profit(3) = 10 | profit(4) = 4 | profit(5) = 3 | profit(6) = 4 | profit(7) = 2 | |
|---|---|---|---|---|---|
| size(foo) = 2 | size(bar) = 2 | size(foobar) = 2 | size(test1) = 1 | size(test2) = 1 | size(test3) = 1 |
| threshold(total size) = 5 | | | | | |

The profit of an edge represents the goodness of inlining that call site. A call site is not inlined if the total size of the corresponding caller and callee exceeds a certain threshold, in this case, 5. After call sites 5, 6, and 7 are inlined, inlining of the call site 3, which had the highest profit, will be rejected since the threshold is reached. While this is a contrived example, the point remains that bottom-up inlining tends to fall into a local minima problem thus missing important call sites, usually around the root of the call-graph. Top-down inline order has the same problem since it tends to miss call sites at the leaves of the call-graph even if they are profitable.

A second problem is that inline analysis phase may become overly complex. The bottom-up and top-down inline analysis methods are computationally inexpensive since the orders are determined by a simple traversal of the call-graph. The worklist based approach may be more computationally expensive than the top-down or the bottom-up inline orders since it involves recomputing the profit of the call sites, affected by inlining, and finding the next best call site. The worst-case complexity of finding the next call site to inline is constant for bottom-up and top-down inline analysis orders. In the case of the worklist based approach, applicants believe that the worst-case complexity of finding the next call site to inline is on the order of log (n), where n is the total number of edges in the call-graph. So, while more expensive, the cost for the worklist based approach is not necessarily prohibitive.

A third problem relates to inline specialization. In the conventional top-down and bottom-up approach, the ability to handle inline specialization is typically lost (though these approaches may possibly be modified to achieve inline specialization). This is because these schemes consider the call-graph as immutable while the inline analysis is performed. We define inline specialization as the following. If there are two call sites x and y with both calling the same routine A, and A has at least one inlinable call site z, the ability to inline different versions of A at call sites x and y is called inline specialization. Two different versions of A can be produced by different inlining within A. For instance, in FIG. 2B, inline specialization can be obtained by having call sites 3 and 4 inline different versions of foobar.

A prior open source (Pro64) compiler from Silicon Graphics, Inc., of Mountain View, Calif., appears to use a level order and a locally-sorted work list. The sorting appears to be only over the call sites for a certain caller. As discussed earlier, the above-referenced "Aggressive Inlining" paper in PLDI '97 builds worklists that are local and not well-formed. In contrast, an embodiment of the invention uses a globally sorted work list. Advantageously, the globally-sorted working-list can achieve better run-time performance because the chance of falling into a local minima is reduced or eliminated.

Inline Analysis

Figure 5:
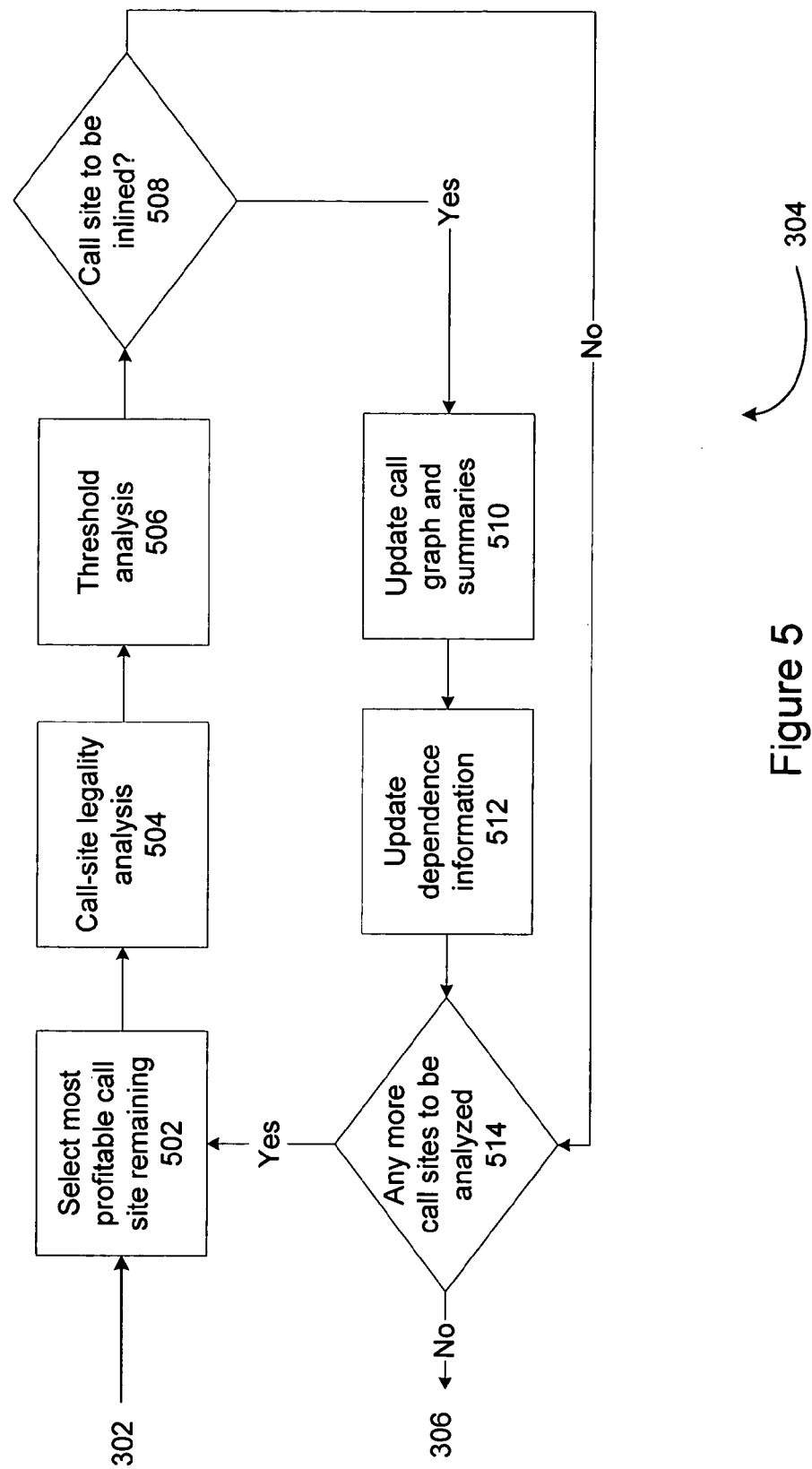
FIG. 5 is a flow chart depicting an inline analysis phase in accordance with an embodiment of the invention.

FIG. 5 is a flow chart depicting an inline analysis phase in accordance with an embodiment of the invention. In accordance with this embodiment, the inline analysis phase includes selecting 502 a most profitable call site remaining, call site legality analysis 504, threshold analysis 506, a determination 508 as to whether the call site is to be inlined, updating 510 the call graph and summaries, updating 512 the dependence information, and a determination 514 as to whether there are any more call sites to be analyzed.

Selection 502 of the most profitable call site remaining on the working list begins the process. Next, legality analysis 504 checks whether it is programmatically correct to inline a callee routine into a caller routine at a certain call site. This includes option checking and matching between the caller and the callee routine, type matching issues between the call site parameters and the callee routine formals, and also checking for any implementation limitations. For instance, inlining of routines with variable number of arguments may not be supported.

The threshold analysis 506 directly affects the performance of the final program. In accordance with one embodiment, heuristics are used to determine whether inlining a call site will improve run-time performance. Threshold values are determined for every criterion this analysis wants to check upon. This may include the call site execution count, the caller and callee execution time as a percentage of the total time, caller and callee size, caller and callee height, effects on register pressure, instruction cache pressure, and data cache pressure. The register pressure refers to a measure of the amount of utilization of the available registers. Similarly, the instruction cache pressure and data cache pressure refer to measures of the amount of utilization of the instruction cache and data cache, respectively. Based on the results of the threshold analysis 506, a determination 508 is made as to whether the call site is to be inlined.

If the call site is not to be inlined, then the process moves to the next call site on the working list. A determination is made 514 as to whether there are any more call sites on the working list to be analyzed. If so, then the process loops back to selecting 502 the most profitable call site remaining, followed by the legality analysis 504, and so on. If not, then the inline analysis phase 304 terminates and the inline transformation phase 306 is entered.

Figure 8:
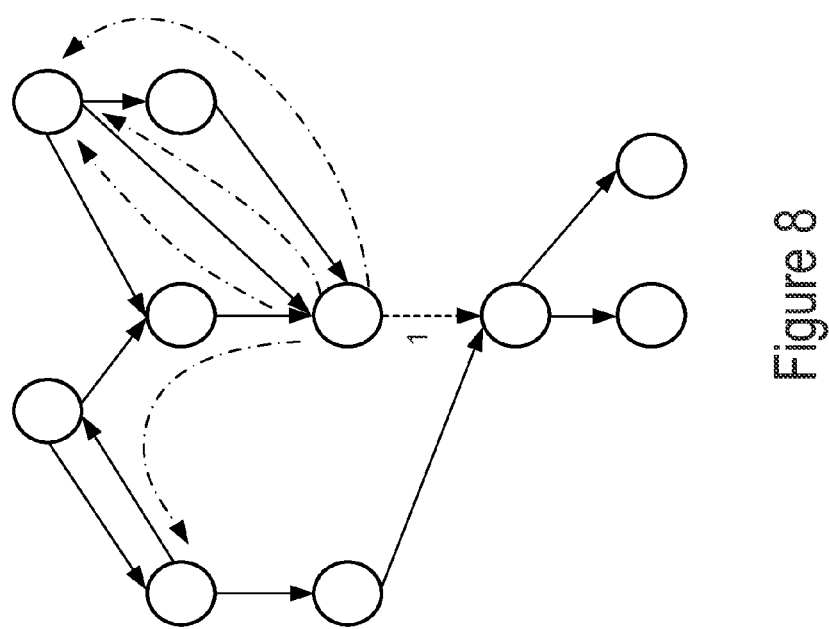
FIGS. 8 through 12 are diagrams illustrating call graphs for various explanatory purposes.

If the call site is to be inlined, then the process continues on to update 510 the call graph, the routine summaries, and the working list. The summaries may need to be updated by iterating on the call-graph. This is necessary in order to capture the effects of inlining a certain call site on various routines. This is emphasized by the illustration of a call-graph shown in FIG. 8. The dashed call-graph edge (also numbered 1) denotes the call site that has been accepted for inlining. The dotted dashed lines indicate how the summaries will need to be propagated through the call-graph.

In accordance with one embodiment, new edges may need to be created after inlining a call site. When a caller routine A inlines a callee routine B, for every edge from routine B to a routine C, a new edge needs to be created from routine A to routine C. Each of these new edges is a candidate for further inlining and hence is inserted in the working list.

Summary Updation

In accordance with one embodiment of the invention, the inline analysis phase does not open the code stream representation of the program. Instead, the analysis framework works on the inliner summaries, and the inliner summaries are updated after every inline decision is made. Ball's paper, "*Predicting the Effects of Optimization on a Procedure Body*", shows how to realize the results of optimizations but his analysis assumes that the IR is available. Our invention differentiates from this work by predicting the effects of optimizations by manipulating summary information without touching the actual IR.

Once the inline analysis phase decides to inline a particular call site, this decision cannot be reversed later. Every time the analysis phase decides to inline a particular call site, the program characteristics of multiple routines can change which in turn can affect subsequent inline decisions. Updating the inliner summaries without modifying the internal code stream representation, impractically large compilation times may be avoided. In accordance with one embodiment, updating the inliner summaries involves identifying the nodes in need of updating and maintaining data structures to support the updating. This is described in more detail now by describing how each kind of in-core summary is updated through the call-graph.

Updating node summaries:
File ID, compilation ID, routine ID, entry ID, signature ID, and routine level options do not need any updation when a callee routine is inlined into a caller routine.
Instruction count: The new instruction count of the caller routine is updated to the sum of the instruction counts of the caller and callee routines before inlining. The instruction count of the callee does not need to be changed.

Entry count: The entry count of the caller remains unchanged. The entry count of the callee is modified as follows:

Entry count of callee=Entry count of callee−Call site execution count

Entry count kind: These values remain unchanged in both the caller and the callee routines.

Height: The height of the callee routine remains unchanged after inlining. The height of the caller routine needs to be changed as follows:

First, a determination is made as to whether the callee routine is critical in determining the height of the caller routine before inlining. If the height of the callee routine is 1 less than the height of the caller routine before inlining and there is no other callee routine with the same property, the callee routine is critical. If the callee routine is critical, updation of heights throughout the call-graph may be necessary. Code segment 1 shows the pseudo-code for an implementation of an algorithm that may be used.

The idea of Code segment 1 is as follows. Given that a caller routine inlines a callee routine, check the height of all the callees of the caller and accordingly adjusts the height of the caller. If the height of the caller changes, all the predecessors of the caller need their heights updated as well. As the algorithm shows, the change in height of the caller may potentially propagate throughout the call-graph that implicitly involves walking a substantial part of the call-graph once. The worst-case scenario is potentially walking through the whole of the call-graph after every decision to inline a call site. However, this rarely happens in reality for multiple reasons. First, many of the callee routines are not critical for a certain inline candidate. Secondly, the propagation usually converges after a few levels.

The experimental results we have performed indicate that this cost is not prohibitive.

Rse overhead: If the call site is not in the critical control flow path of the caller routine, then the rse overhead of the caller does not need to be updated. Assuming that the call site resides in the critical control flow path of the caller routine, a check is made to see whether the callee routine has a higher rse overhead than the caller. In such a scenario, the rse overhead of the caller routine is set to that of the callee routine.

Dcache pressure: If the call site is not in the critical control flow path of the caller routine, then the Dcache pressure of the caller does not need to be updated. Assuming that the call site resides in the critical control flow path of the caller routine, a check is made to see whether the callee routine has a higher Dcache pressure than the caller. In such a scenario, the Dcache pressure of the caller routine is set to that of the callee routine.

Number of CFG nodes: The estimate of CFG nodes of the caller routine is increased by the estimate of CFG nodes of the callee routine. The estimate of the number of CFG nodes of the callee routine always remains unchanged for a certain inline.

Number of CFG edges: The estimate of CFG edges of the caller routine is increased by the estimate of CFG edges of the callee routine. The estimate of the number of CFG edges of the callee routine always remains unchanged for a certain inline.

Total execution time: If the call site resides in the critical control flow path of the caller routine, the estimate of the total execution time of the caller routine needs to be changed. Otherwise, no updation is required for the caller routine. The estimate of the total execution time of the callee routine always remains unchanged for a certain inline. The following equation shows how the estimate is changed for the caller routine when necessary.

New_execution_time=old_execution_time+(execution_time_of_callee/Total execution frequency of callee)* Execution frequency of the call site If the caller or the callee routine for a certain call site has its summary information modified, the goodness factor of that call site is recomputed. Whenever the goodness factor of a certain call site is recomputed, the old entry is deleted from the working list and a new updated entry is inserted.

Code segment 1

```
UpdateNecessaryNodesHeight(caller, callee, caller_summary,
callee_summary, done)
{
    Use done to break any recursive loop and update done
    caller_height = caller_summary->GetHeight( )
    callee_height = callee_summary->GetHeight( )
    maximum_height = -1
    for (all outgoing edges of the caller)
    {
        curr_edge = Get the current edge
        curr_callee_routine = Get callee routine of curr_edge
        curr_callee_height = Get height of curr_callee_routine
        if (curr_callee_height > maximum_height)
            maximum_height = curr_callee_height
    }
    caller_summary->SetHeight(maximum_height + 1)
    if (caller_height == maximum_height + 1) return
    //Since the height of the caller got updated, the ancestors of the caller
    need to be updated
    for (all incoming edges of the caller)
    {
        curr_edge = Get the current edge
        curr_ancestor = Get caller routine of curr_edge
        curr_ancestor_summary = Summary of curr_ancestor
        curr_ancestor_height =
            curr_ancestor_summary->GetHeight
        if (caller_height == curr_ancestor_height - 1)
            UpdateNecessaryNodesHeight(
                current_ancestor, curr_caller,
                current_ancestor_summary, caller_summary, done)
    }
}
```

The following gives an equation for computing the goodness factor.

IC=Instruction count
H=Height
RO=Rse overhead
DP=Dcache pressure
N=Number of basic block nodes
E=Number of basic block edges
ET=Execution time
CEC=Call site execution count $$Goodness=(ET*CEC)/(IC*H*RO*DP*N*E)$$

We performed experimental results to understand the performance benefit of the working list approach over a call-graph based traversal approach. Table 1 shows the run-time performance improvement (in percentage) achieved by moving from a bottom-up analysis to a working list approach. The results are for SPEC2000 integer benchmarks run on an Itanium2 1.5 MHz machine.

TABLE 1

| Benchmark | Performance Improvement (%) |
| --- | --- |
| 164.gzip | 0.69 |
| 175.vpr | 2.67 |
| 176.gcc | 2.81 |
| 181.mcf | 0.50 |
| 186.crafty | −0.25 |
| 197.parser | 0.69 |
| 252.eon | 1.31 |
| 253.perlbmk | 7.29 |
| 254.gap | 8.09 |
| 255.vortex | 17.62 |
| 256.bzip2 | 0.00 |
| 300.twolf | −0.22 |

Inline Specialization

We introduce the concept of inline specialization whereby a call site, that is common to more than one call chain, gets inlined in only some of the call chains. Thus the common call site gets inlined in a specialized manner. This ability allows inlining of call sites in call chains where it is beneficial for run-time performance and disallows inlining of call sites in call chains where it is not beneficial for run-time performance. "Evaluating inlining techniques" by Kaser and Ramakrishnan describes versioning of routines during inlines by theoretically computing the number of call sites before and after inlines from a call-graph with execution counts. However, this paper is purely theoretical and does not describe how to implement inline specialization. Our invention is distinct in that it details a method to perform inline specialization and shows how to solve the associated issues. Our novel framework requires addition of new call sites to the IR, materializing the identification and summary information for these call sites, generating and maintaining dependences for these call sites, and potentially inlining these added call sites. An embodiment of our invention handles all of these issues seamlessly and achieves significant run-time performance benefits.

There are compile-time effects of performing inline specialization. In order to perform inline specialization, new edges need to be added to a call-graph. This requires maintaining summaries for more call-graph edges and may result in more inlining. However, as we will see later, this cost is acceptable for the run-time performance that inline specialization achieves.

Figure 6:
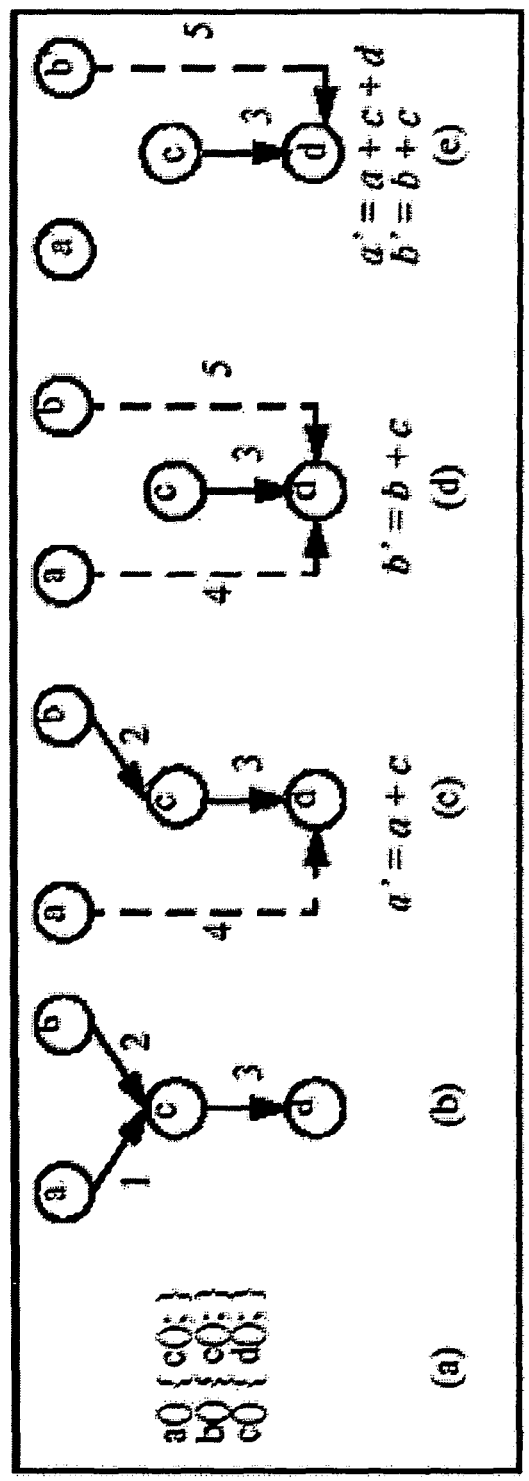
FIG. 6 is a diagram used to illustrate inline specialization.

We now discuss the creation of new edges and the consequences thereof in further detail. To visualize the call-relationship after a routine is inlined into another, we refer to FIG. 6. FIG. 6(a) shows a simple code segment. FIG. 6(b) shows the corresponding call-graph. FIG. 6(c) shows the call graph after a decision is taken to inline the call site 1. A new edge 4, shown as a dotted edge, is added from node a (now a') to node d. This is because when node a inlines node c, the call to node d gets imported into a. This new call site, 4, is inserted into the work-list and is considered by subsequent inline analysis. FIG. 6(d) shows the call-graph after a decision is taken to inline the call site 2. A new edge 5, shown as a dotted edge, is added from node b (now b') to node d. It is to be noted that subsequent to the scenario shown in FIG. 6(d), the inline analysis phase could decide to inline only one of call sites 4 and 5. If call site 4 is inlined without inlining call site 5, this would achieve inline specialization, as shown in FIG. 6(e). This is because node a (now a") will have inlined both nodes c and d, while node b (denoted b') will have inlined node c alone.

The following are the data structures that are used for maintaining information about new edges.

EdgeSet is a set of call-graph edges. In pseudo-code format, it can be written as set<IPA_CallGraph::EdgeId>EdgeSet MapEdgeDep maintains the dependences for a certain call-graph edge and is a hash_map from a call-graph edge to a set of call-graph edges. In pseudo-code format, it can be written as hash_map<IPA_CallGraph::EdgeId, EdgeSet>MapEdgeDep High level pseudo-code for creating new edges is shown in Code segment 2.

Code segment 2

```
CreateNewEdge(inlined_edge)
{
    caller_of_inlined_edge = GetCaller(inlined_edge)
    callee_of_inlined_edge = GetCallee(inlined_edge)
    for_every_outgoing_edge(callee_of_inlined_edge)
    {
        if (not_already_inlined(current_outgoing_edge)
        {
            target_node = GetCallee(current_outgoing_edge)
            new_edge=AddEdge(caller_of_inlined_edge,
            target_node)
            CreateEdgeSummary(new_edge)
            AddDependence(new_edge, inlined_edge)
            BookKeep(new_edge)
        }
    }
}
AddDependence(new_edge, inlined_edge)
{
    EdgeSet edge_set
        edge_set.insert(inlined_edge)
        MapEdgeDep_[new_edge] = edge_set;
}
```

When a new edge is added to the working list, that new edge will also be examined for possible inlining. Hence, all the relevant summaries needed for the inlining analysis need to be created or updated. Most of the summary information for the new edge can be obtained from the associated caller and callee routines and the corresponding inlined edge. This includes the edge execution count and the type information of the parameters at the call site. However, the ID of the new call site (in the form of the IR) is unknown in the inline analysis phase. This can be appreciated by considering FIG. 6(c) again. When the new edge, 4, is created in the inline analysis phase because of inlining callee node c into caller node a, the call site ID of edge 4 is unknown. This is because this ID corresponds to the one that will get imported from routine c into routine a only after actual inline transformation of call site 1 takes place. It is to be recalled that in accordance with an embodiment of the invention, the inline analysis and transformation phases are distinct and the transformation phase starts only after the analysis is completely done. However, it turns out that the analysis phase does not really need the call site ID to make inlining decisions. This is summary data that is required by the transformation phase before the corresponding call site, in this example, edge 4, can be inlined. However, this implies that there is a dependence from call site 4 to call site 1 since inline transformation of call site 1 will have to be performed before call site 4. Such dependence is described in further detail below.

In addition to updating 510 the call graph and inliner summaries, dependence information is also updated 512 in accordance with an embodiment of the invention. Thereafter, the determination is made 514 as to whether there are any more call sites on the working list to be analyzed. If so, then the process loops back to selecting 502 the most profitable call site remaining, followed by the legality analysis 504, and so on. If not, then the inline analysis phase 304 terminates and the inline transformation phase 306 is entered.

Dependence information and the updating thereof are now further described. When inline transformation of edge y has to be performed before inline transformation of edge x can be done, then edge x is dependent on edge y. The following three kinds of dependences need to be maintained between call-graph edges, for correctness and performance purposes. First, for every new edge x added because of inline of edge y, edge x is dependent on edge y. This dependence needs to be maintained for correctness purposes since inline transformation of call site y creates the intermediate representation for edge x. Second, after every decision to inline an edge x, if there is an existing outgoing edge, y, from the callee node of edge x, and y is marked inline, then edge x is dependent on edge y. This dependence needs to be maintained for performance reasons. Third, after every decision to inline an edge x, if there is an existing incoming edge, y, into the caller node of edge x, and y is marked inline, then edge x is dependent on edge y. This dependence needs to be maintained for performance reasons. The second and third dependencies above are used to maintain proper run-time performance. These dependences preserve the mutual order from the inline analysis phase to the inline transformation phase for call-graph edges that share a call-graph node. If two call-graph nodes do not share a node, these rules are not necessary. However, the first dependence above is necessary for correctness in the sense that it is impossible for the compiler to proceed if this dependence is not satisfied. If a new edge, x, is dependent on edge y, the internal representation of the new edge, x, needs to be materialized when edge y is inlined.

New Edge ID Materialization

At the end of the inline analysis phase, the new edges have unknown call site identification. Before a new edge can be inlined, this call site ID must be patched with the correct data. The previous section on adding dependence for new edges describes how the correct transformation ordering is maintained so that inline transformation of all the necessary edges occurs prior to the inline transformation of a certain new edge. This section describes how, after inlining of a call graph edge, the new edges, that were created as a result of inlining of this call graph edge, are patched up. High-level pseudo-code in one embodiment of this procedure is given below.

```
                        Code Segment 3
1    PatchCallSite(initial_edge, original_statement,
     cloned_statement)
2    {
3        id = GetUniqueId(original_statement)
4        cs_edge_itr_pair = GetMapEdgeId(id)
5        callee = GetCallee(initial_edge)
6
7        successor_edge = FindMatchingEdge(cs_edge_itr_pair,
         callee)
8        new_edge = FindNewEdge(initial_edge, successor_edge)
9
10       PatchNewInlineEdge(new_edge, cloned_statement)
11
12       if (GetCaller(initial_edge).isNotMultipleEntry( )) return
13
14       initial_edge_unique_id = GetUniqueId(initial_edge)
15       cs_initial_edge_itr_pair =
         GetMapEdge(initial_edge_unique_id)
```

```
                      -continued
                    Code Segment 3
16       cs_begin_initial_edge_itr_pair =
         cs_initial_edge_itr_pair.first
17       cs_end_initial_edge_itr_pair =
         cs_initial_edge_itr_pair.second
18       for (; cs_begin_initial_edge_itr_pair !=
         cs_end_initial_edge_itr_pair;
19           ++ cs_begin_initial_edge_itr_pair)
20       {
21           curr_initial_edge =
             cs_begin_initial_edge_itr->second
22           curr_initial_edge_unique_id =
             GetUniqueId(curr_initial_edge)
23           curr_new_edge=FindNewEdge(curr_initial_edge,
             successor_edge)
24           PatchNewInlineEdge(curr_new_edge,
             cloned_statement)
25       }
26   }
```

The helper function, PatchCallSite, may be called by the inline transformation phase during inlining of a certain call-graph edge. Let us consider a call-graph edge, x from call-graph node a to call-graph node b. If node b contains a call statement, z, this call statement, z, needs to be imported into the routine, a, as a call statement, say w. This call statement, w, corresponds to a new edge. So the corresponding new edge needs to be patched up with the internal representation of the call statement, w. In code segment 3, the initial_edge corresponds to the call site being inlined (x, in the above example). The original_statement corresponds to the call statement, under consideration in the callee routine of the call site being inlined (z, in the above example). The cloned_statement refers to the call statement that is imported into the caller routine of the call site being inlined (w, in the above example). Line 3 obtains the unique identification of the original_statement. This unique identification is a representation that encodes the compilation environment, the routine, and the statement information corresponding to the original_statement. Line 4 obtains the identification of the call-graph edges that correspond to this unique identification of the original_statement. Code segment 4 shows that, because of the possible presence of multiple entry routines, a unique ID may correspond to more than one call-graph edge.

```
                    Code Segment 4
     Routine Sample( )
     {
         call Test2( )
     }
     Routine Test( )
     {
         Entry Test1
         Goto L
         Entry Test2
         Goto L
         Entry Test3
     L:  call foo
     }
     Routine foo( )
     {
     }
```

Figure 9:
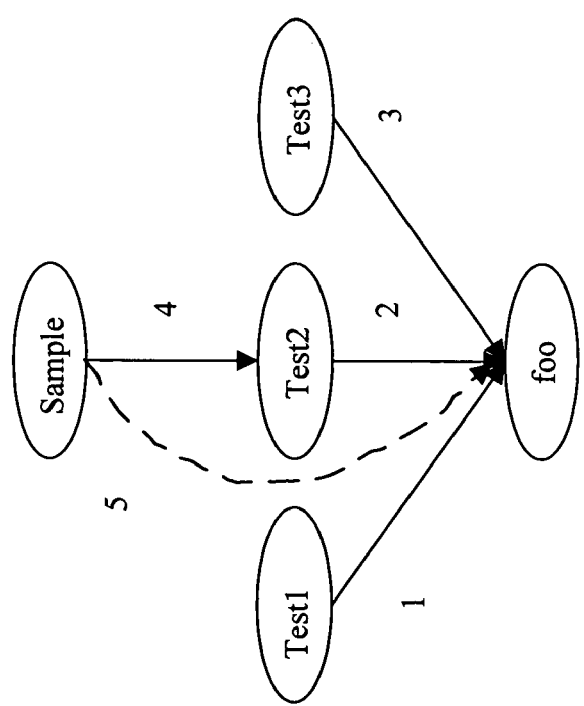

The pseudo-code above shows a routine called sample that calls an entry point, Test2, of a routine Test. L is a labeled statement in routine Test that has a call to a routine called foo. The diagram in FIG. 9 shows the call-graph corresponding to the pseudo-code. A call-graph node is created for every entry of routine Test. The call to routine foo is accessible from each of the entries of routine Test and hence call-graph edges 1, 2, and 3 are created. Thus the unique identification of the call statement, foo, may correspond to multiple call-graph edges, in this case, edges 1, 2, and 3.

Let us look at line 4 of code segment 3 again. cs_edge_itr_pair refers to multiple call-graph edges. Let us consider FIG. 9 again. The initial_edge is call-graph edge 4. The new call-graph edge that is created because of inlining edge 4, is edge 5 shown in dotted lines. Since multiple call-graph edges can correspond to the original_statement, an algorithm is required to determine the one call-graph edge that is the correct call-graph edge corresponding to the original_statement and the initial_edge. This is shown in lines 5 and 7. First, the call-graph node corresponding to the callee of the initial_edge is obtained. Secondly, the edge (among the multiple edges already chosen) whose caller is the same as the above callee node is selected as the correct successor edge. This is shown in FindMatchingEdge in code segment 5.

Code Segment 5

```
FindMatchingEdge(cs_edge_itr_pair, callee)
{
    cs_edge_itr = cs_edge_itr_pair.first;
    cs_edge_end=cs_edge_itr_pair.second
    for (; cs_edge_itr != cs_edge_end; ++ cs_edge_itr)
    {
        succ_edge_id = cs_edge_itr->second
        if (GetCaller(succ_edge_id) == callee_id)
        {
            return succ_edge_id
        }
    }
}
FindNewEdge(initial_edge, successor_edge)
{
    id = GetUniqueId(initial_edge, successor_edge)
    return SuccNewMap.find(id)
}
```

Once the successor edge is obtained, we need to obtain the new edge that corresponds to the initial edge and the successor edge. This is obtained in line 8 in code segment 3 from a mapping table, SuccNewMap, that is created during the inliner analysis phase. The pseudo-code for obtaining the new edge is shown below.

Once the new edge is obtained, the patch-up is done by copying the ID of the cloned_statement to the new edge. This is shown in line 10 of code segment 3 and the corresponding pseudo-code is shown in code segment 6. As shown in code segment 6, the new edge is patched only if this edge is in the list of inlinable call sites. MapCgEdgeInlDescr indicates whether an edge is in the list of inlinable call sites.

Code Segment 6

```
PatchNewInlineEdge(new_edge, cloned_statement)
{
    MapCgEdgeInlDescr::const_iterator ci =
    MapCgEdgeInlDescr_.find(new_edge);
    If (ci != MapCgEdgeInlDescr_.end())
    {
        new_edge_descr = ci->second
        new_edge_descr->SetId(cloned_statement->GetId())
    }
}
```

Figure 10:
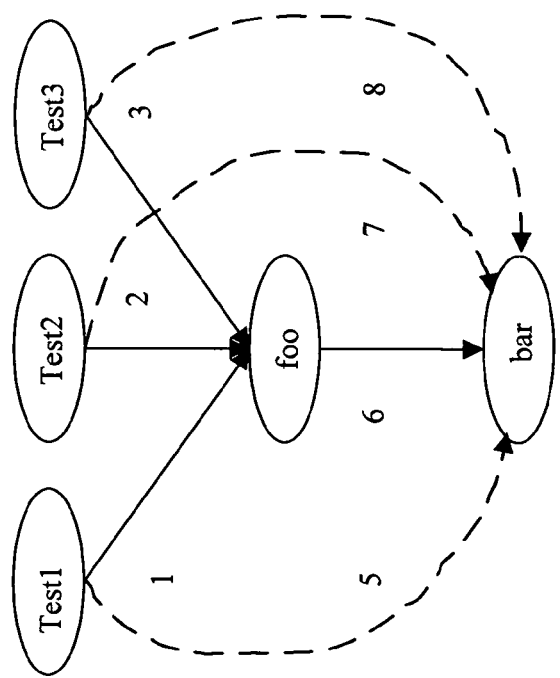

If the caller node of the initial edge belongs to a multiple entry routine, we are not yet done. Lines 14-26 of code segment 3 deal with this scenario. First, let us illustrate the problem with code segment 7 and FIG. 10.

Code Segment 7

```
Routine Test( )
{
    Entry Test1
    Goto L
    Entry Test2
    Goto L
    Entry Test3
L:  call foo
}
Routine foo( )
{
    call bar
}
Routine bar( )
{
}
```

As shown in code segment 7, the routine Test has 3 entry points, Test1, Test2, and Test3. The edges 1, 2, and 3 correspond to the call to routine foo from the routine Test. The edge 6 corresponds to the call from foo to bar. When the call from routine Test to routine foo is inlined, it corresponds to inlining each of the edges 1, 2, and 3. This leads to the introduction of new edges shown in dotted lines and marked 5, 7, and 8 in FIG. 10. Thus, when any of the edges, 1, 2, and 3 is inlined, all of the edges, 5, 7, and 8 must be patched up. This is what lines 14-26 achieve. Line 14 obtains the unique identification of the initial inlinable edge. Line 15 obtains the set corresponding to all call-graph edges that can correspond to the unique ID of the initial edge. The loop in lines 18-25 of code segment 3 iterates through these edges, finds the corresponding new edge, and patches it up.

TABLE 2

| Benchmark | Increase in the number of inlines |
|---|---|
| 164.gzip | 10 |
| 175.vpr | 13 |
| 176.gcc | 5 |
| 181.mcf | 0 |
| 186.crafty | 1 |
| 197.parser | 9 |
| 252.eon | 10 |
| 253.perlbmk | 5 |
| 254.gap | 6 |
| 255.vortex | 3 |
| 256.bzip2 | 4 |
| 300.twolf | 4 |

We performed experiments to understand the increase in complexity caused by creation of new edges. In order to understand this, we present the increase in the number of inlines owing to the addition of new edges. As can be seen from the results, the percentage is quite low and adds only a slight complexity to the whole compilation process. The results are presented for SPEC2000 integer benchmarks in Table 2.

As is evidenced by the above results, the addition of new edges does add to the complexity of the scheme. The compile-time increases as well. Table 3 shows the compile-time slow-down (in percentage) when inline specialization is performed. As indicated by the data, the overhead of this scheme is pretty small, and hence the scheme is advantageous given that it brings run-time benefits.

TABLE 3

| Benchmark | Compile-time slowdown |
|---|---|
| 164.gzip | 14% |
| 175.vpr | 7% |
| 176.gcc | 0% |
| 181.mcf | 0% |
| 186.crafty | 0% |
| 197.parser | 8% |
| 252.eon | 0% |
| 253.perlbmk | 0% |
| 254.gap | 0.5% |
| 255.vortex | 1% |
| 256.bzip2 | 0% |
| 300.twolf | 0% |

In Table 4, we present the run-time benefits that inline specialization brings for SPEC2000 integer benchmarks.

TABLE 4

| Benchmark | Improvement |
|---|---|
| 164.gzip | −0.42% |
| 175.vpr | 0.25% |
| 176.gcc | −0.71% |
| 181.mcf | 0.12% |
| 186.crafty | −0.25% |
| 197.parser | 0.23% |
| 252.eon | 1.70% |
| 253.perlbmk | 1.89% |
| 254.gap | 0.10% |
| 255.vortex | 2.14% |
| 256.bzip2 | 0.41% |
| 300.twolf | 4.25% |

Inline Transformation

It is a common programming technique to divide an application into multiple modules using a divide and conquer paradigm. In the case of a typical large application, there are thousands of files that together make up the program. This usually works well for single-file optimization modes where a compiler needs to rebuild individually only the files that changed and then the newly changed objects are linked with the old ones. In the case of a cross-module optimizer, however, the issues may be different. Cross-file optimizations such as inlining may need to work on two different files at the same time during the inline transformation phase. This poses some problems with respect to the compilation time and memory requirement of the inline transformation phase for the cross-file optimization.

As understood by the applicants, there are manifold issues relating to file maintenance in the inline transformation phase. First, there is a limitation on the number of files that a process can have open at a certain point of time. Second, there is a limitation on the amount of memory that is required for the open files. Given these two constraints, the inline transformation phase will reach a point of time when it needs to close some files before it can open other files. This leads to the following questions. When the file-limit or the memory-limit is reached, which file should be closed? When a new file needs to be opened, which file should be chosen? Is there an inline transformation order that minimizes the number of opens, closes, and writes of files? One embodiment of the invention relates to an inline transformation phase that reduces or minimizes the number of opens, closes, and writes of files (i.e. input/output or I/O). Solutions to choose the appropriate file to open or close are also presented.

Figure 7:
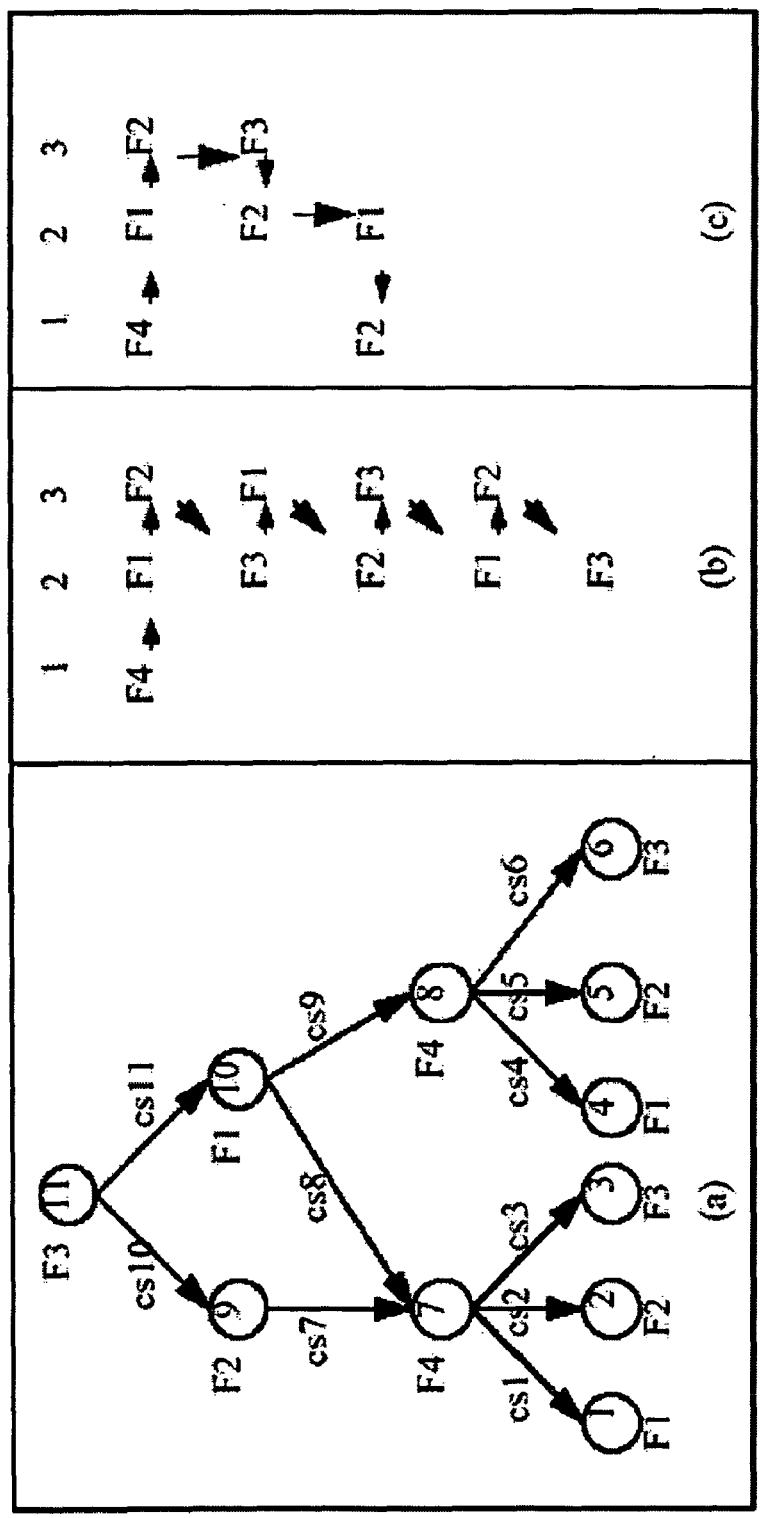
FIG. 7 is a diagram used to illustrate I/O related issues in the transformation phase.

FIG. 7 is an illustration of a call-graph for exposing I/O related issues in the transformation phase. Nodes represent routines while edges represent call sites. For instance, an edge from node 7 to node 1 denotes a call from routine 7 to routine 1. The source file where a certain routine resides is also shown in FIG. 7. For example, the definition of node 7 is in file F4 whereas the definition of node 1 is in file F1. Let us assume that there can be a maximum of 3 files that can remain open at any point of time. With this constraint, let us consider two inline transformation orders:

(1) bottom-up order, which starts with leaves of a call-graph and works its way up towards the root.; and
(2) a simple variant of I/O-sensitive order, which chooses call sites and files to open, close, and rewrite in order to minimize the I/O requirement.

By choosing method (1) above, we obtain the file I/O shown in FIG. 7(b). The call sites inlined in order are CS1-CS2-CS3-CS4-CS5-CS6-CS7-CS8-CS9-CS10-CS11. Inlining of CS1 requires opening files where the caller and the callee reside, namely F4 and F1. Inlining of CS2 requires opening file F2 since the callee resides in F2. The caller resides in F4 that is already open. Inlining of CS3 requires that F3, where the callee resides, be opened. However, the limit on the total number of open files, 3 in this simple example, is already reached. Hence, at least one file needs to be closed before F3 can be opened. Using a simple least-recently-used technique (LRU), F1 is closed and F3 is opened. CS4 requires opening F1 and this will cause closing F2. This process is followed until all inlines are done. The file I/O incurred in this process is shown in FIG. 7(b). The arrows between the files in FIG. 7(b) denote the order in which the files are opened. The files in a certain column denote the files that are closed and opened. The presence of an entry, $F_{ij}$, in row$_{ij}$, and an entry $F_{i(i+1)j}$, in row$_{(i+1)j}$, denotes that at that point, $F_{ij}$ is closed and $F_{(i+1)j}$ is opened in order to perform the inline at that situation. For instance, let us consider column 2 in FIG. 7(c). F1 in the first row denotes that F1 is opened. F2 in the second row indicates that at that point, F1 is closed and F2 is opened.

By choosing method (2) above, the file I/O shown in FIG. 7(c) is obtained. As for method (1), the call sites inlined in order are CS1-CS2-CS3-CS4-CS5-CS6-CS7-CS8-CS9-CS10-CS11. It is to be noted that it is possible to choose a different inline order in order to minimize the I/O requirement. While more details about this aspect are presented in later sections of this application, we maintain the same order between (1) and (2) to keep the example in FIG. 7 relatively simple. Method (2) proceeds in the following manner. The first 2 inlines, CS1 and CS2, require opening files, F4, F1, and F2, in this order. When CS3 is inlined, a look-ahead is employed which looks at the next few inlines in order to decide the file to close instead of making an arbitrary choice. Use of a look-ahead is possible since there are distinct inline analysis and transformation phases. In addition, since the inline decisions are final once the inline analysis phase is done; there is no way to override these in the inline transformation phase. In order to inline CS3, the inliner needs to open file F3 since the callee routine 3 resides in it. File F4, which contains the caller routine 7, is already open. At this point, the lookahead mechanism observes that the very next inline of call site CS4 will require files F4 and F1. This, along with the current state of open files (F4, F1, F2), causes a lower weight to be assigned to F2. This leads to closing F2 and opening F3 for inlining the call site CS3. While inlining CS4, both F4 and F1 are already open. While inlining CS5, F1 is closed and F2 is opened using the look-ahead technique. While inlining CS6, both F4 and F3 are already open. The sequence of file opens and closes for the rest of the inlines are shown in FIG. 7(c). While this example is simplistic, it does show a substantial reduction in the number of file opens and closes in FIG. 7(c) compared to FIG. 7(b).

One embodiment of the invention relates to a technique to improve the compile-time and memory requirement of the inline transformation phase during cross-file optimization by intelligently managing the file I/O. This embodiment involves dynamic computation of an ordering on the inlinable call sites such that the total number of file opens, reads, and writes are minimized. The technique is dynamic since the call sites are ordered in the inline transformation phase independent of the inline analysis phase and the ordering happens by looking concurrently at the system resources and the inline requirements and constraints.

Applicants believe that this technique makes at least the following inventive contributions to the state of the art:

(1) A technique for representing source files (or compilation units, or link units), and the inlining relationship existing between a caller and a callee routine in those source files, in the form of a directed labeled graph (inline affinity graph);
(2) A useful definition of an inlining dependence between call sites;
(3) A technique to compute and represent the inlining dependence of a call site on another call site in the form of a dependence graph;
(4) Using (1)-(3) above, a technique to choose the inlining order so that the total I/O is minimized;
(5) Using (1)-(3) above, an efficient technique to choose files for open, write, and close;
(6) A technique to dynamically update the inline affinity graph and the dependence graph as the inlines are completed.

The applicants believe that the above contributions achieve the following advantages:

a) The compile-time for cross-module inlining remains low and scales well with the number of files as well as the number of inlines. This makes very fast IPO for very large applications a reality;
b) The high watermark for memory usage is reached late in the cross-module inlining phase thus exerting less pressure on the memory subsystem; and
c) Using explicit memory management, it can be guaranteed that irrespective of the number of files and the number of inlines, out-of-memory situation will never be reached in the cross-module inliner.

Regarding contribution (1) above, the inline affinity graph is a weighted directed graph representing the inlining relationship between source files. In this graph, a node, A, denotes a source file, A. An edge, x, from node A to node B, denotes that there is an inlinable call site from a caller routine in source file A to a callee routine in source file B. There is a weight assigned to every edge, x, from node A to node B, denoting the number of such call sites originating from source file A and calling a routine in source file B. The inline affinity graph captures the inlining relationship between source files. The degree of affinity is captured by the weight on the edges between the two corresponding graph nodes. This is used by the ordering algorithm to choose files to open or close given a current set of open files.

In accordance with one embodiment of the invention, the inline analysis phase creates the following data structures for consumption by the inline transformation phase.

A hash map from a source file (or link unit) to a set of call sites that are inlined within this source file. This may be denoted by MapSourceToSetOfCallSites.

A call-graph where the nodes represent routines and the edges represent call sites.

Call-graph node summaries. This may be denoted by CGNodeSummary.

Call-graph edge summaries. This may be denoted by CGEdgeSummary.

Code segment 8 shows a high-level pseudo-code for building an inline affinity graph in accordance with one embodiment. In the pseudo-code, CG is an abbreviation for call graph, and AG is an abbreviation for affinity graph.

---
Code Segment 8
---

```
BuildInlineAffinityGraph( )
{
    for all link units in MapSourceToSetOfCallSites
    {
        if AG node not already created for current_link_unit
            current_ag_node = CreateAGNode(current_link_unit)
        else get already created current_ag_node
        for all call sites in MapSourceToSetOfCallSites corresponding to
        current_link_unit
        {
            callee_routine = CallGraph->GetCallee(current_call_site)
            callee_link_unit=
                GetLinkUnit(GetNodeSummary(callee_routine))
            if AG node not already created for callee_link_unit
                callee_ag_node = CreateAGNode(callee_link_unit)
            else get already created callee_ag_node
            if AG edge from current_link_unit to callee_link_unit not
            already created
            current_ag_edge = CreateAGEdge(current_ag_node,
            callee_ag_node)
            else get already created current_ag_edge
            increment current_ag_edge->frequency
        }
    }
}
```

Now inline dependence is further discussed. In the context of a call-graph, edge x is dependent on edge y, when inline transformation of edge y has to be performed before inline transformation of edge x. Some of the inline dependences are required because of correctness, while others are needed to maintain an order among the inlined call sites so as to achieve the best performance.

In accordance with one embodiment of the invention, the inline dependence relationship is maintained as a hash map from a call-graph edge, x, to a set, Y, containing the call-graph edges x is dependent upon. No ordering needs to be maintained among the edges in Y. Once all edges or call sites in set Y are inlined, edge x can be inlined. This data structure implicitly implements an undirected inline dependence graph.

Figure 11:
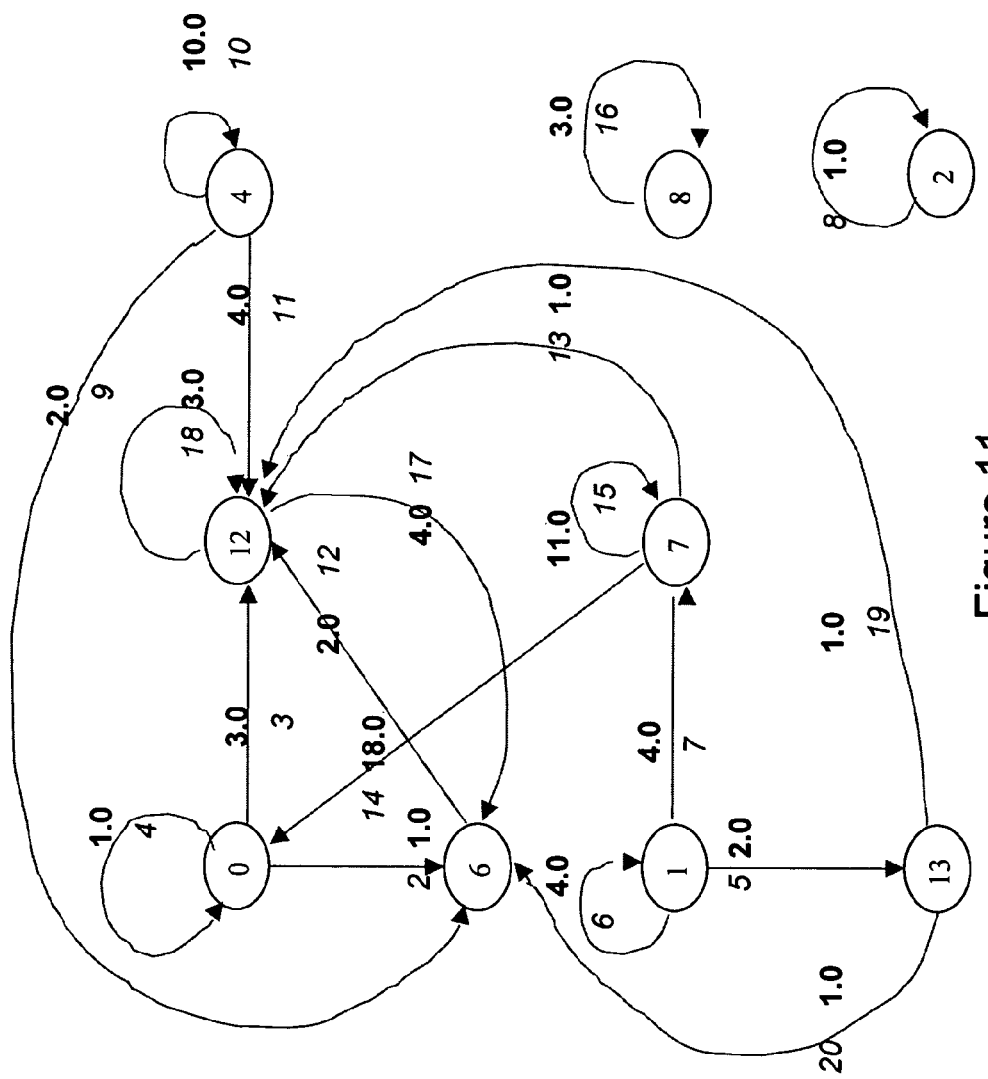

FIG. 11 shows the inline affinity graph that is obtained for a SPEC2000 integer benchmark, 164.gzip. There are 14 source files in this application. Based on the call sites selected for inlining by the analysis phase, 9 files are used by the inline transformation phase. These files are numbered 0, 1, 2, 4, 6, 7, 8, 12, and 13. These are represented as nodes in the inline affinity graph as illustrated in FIG. 11.

In FIG. 11, the edges are annotated with 2 values. The integer value (in italics) denotes the ID of the edge whereas the real value (in bold) denotes the weight of the edge. In the current implementation, the weight denotes the number of call sites sharing the same relationship between caller and callee files. A real value is used in order to facilitate easy incorporation of other factors in future implementations. For instance, let us consider the edges starting from node 0. There is a self-loop on node 0, numbered edge 4. The weight of 1.0 indicates that there is 1 call site whose caller and callee routines both reside in the same source file, namely file 0. There is an edge, 3, from source file, 0, to source file, 12. It has a weight of 3.0 indicating that there are 3 call sites where the caller routine resides in file 0 and the callee routine resides in file 12. It is to be noted that the caller and the callee routines are not necessarily the same for these 3 call sites, it is just that the files that they reside in are the same. There is an edge, 2, from source file, 0, to source file, 6. This edge has a weight of 1.0 indicating that there is a single call site with the caller routine residing in file 0 and the callee routine residing in file 6. The presence of the other edges in the inline affinity graph illustrated in FIG. 11 can be explained in a similar manner. While the inline affinity graph maintains the strength of the affinity between 2 source files, the actual call sites (or call-graph edges) are maintained separately as a list corresponding to every source file.

In accordance with one embodiment of the invention, the inline transformation phase creates and maintains the following data structures.

A pair containing the edge ID and the frequency of the edge in the inline affinity graph. This is denoted by EdgeWeightData.

A vector of EdgeWeightData is denoted by EdgeWeightDataTable.

There is a phase in the top-level driver that creates a table containing the edges in the inline affinity graph in some priority order. One embodiment of the invention simply uses a sorted order of edges in the inline affinity graph. Once the EdgeWeightDataTable is created by a traversal over the edges in the inline affinity graph, the table is sorted on the frequency in a descending order.

ChooseBestUnvisitedEdge is a utility routine that obtains the next edge in the inline affinity graph for the top-level routine to examine. One embodiment of the invention simply selects the first entry from EdgeWeightDataTable that has not yet been visited. Thus this routine returns the edge in the inline affinity graph that has the largest frequency among the unvisited edges.

One embodiment of the invention maintains a data structure for keeping track of files that are open at a certain point of time. This data structure, MapOpenFileSummary, is a map from a file to a summary of the file. The summary for a file contains information about its size, and whether it is dirty. The dirty bit indicates that this file has been modified and hence needs to be written out to disk before it can be closed.

Our scheme has an idea of a hold state that is defined as a situation when no more link units can be opened without closing some. This is because either the maximum file limit or the maximum memory limit has been reached for the open files. In such a scenario, it is useful to complete all the inlines that can be satisfied by the open files. The routine, InlineEdgesInOpenFiles, goes through the files that are open and examines each and every uninlined edge in the affinity graph. If an edge has no dependences and both the caller and callee files are currently open, that call site is inlined. If an edge in the inline affinity graph has dependences, we try to inline as many dependencies as possible if the caller and callee files are currently open. Note that it may require multiple iterations to converge. However, we may decide not to iterate. In many situations, it may happen that there are some edges that have no dependencies and that they can be satisfied with the currently open files. It is a good idea to visit these edges before the ones that have dependencies. This potentially will open up more satisfaction of dependent edges.

Our scheme has an idea of cold files. A file is cold, when for certain reasons, a lower priority should be assigned to it while choosing a file to open. Examples of scenarios when a file is considered cold are:

A file is not involved in inlining

All inlines from or to a file have been completed

Our scheme has the ability to capture a potential out-of-memory situation. This situation can be reached if the number of open files reaches a certain limit or if the total size of opened files reaches a certain limit. In such a situation, a status-handler is called which does some cleanup and bookkeeping before inlines can proceed. Code segment 9 shows the top-level transformation driver in accordance with one embodiment of the invention. The transformation driver works on both the inline affinity graph ("ag") and the inline dependence graph ("dg"). The top-level algorithm is a simple iterative process consisting of the following broad steps:

An edge from the inline affinity graph is chosen. One embodiment of the invention simply chooses the edge with the highest weight since the weight signifies the number of inlines that can potentially be satisfied with the source files corresponding to the chosen edge. One potential pitfall is the possibility of this edge having dependences on other edges of the inline affinity graph that have not yet been considered. However, in the general case, the percentage of inlines (for a certain edge in the inline affinity graph) that have dependences are assumed to be approximately uniform throughout the inline affinity graph. Assuming that the dependence relationship is not extremely biased towards a few ag-edges, this scheme should work well. In scenarios where the bias is extremely high towards a few ag-edges, this scheme will still work correctly but with reduced efficiency.

The source files corresponding to the chosen edge are retrieved. It may be noted that these two source files may be the same signifying that the inlines are intra-file i.e. the caller and the callee reside in the same file.

Before inline transformation can proceed, the source files corresponding to the inline need to be opened. This is referred to as the preparation phase for the impending inline.

The preparation phase returns a status which can be one of the following values: prepn_true (i.e. preparation was successful and the inline can proceed), prepn_false (i.e. preparation was not successful), prepn_out_of_memory (i.e. preparation was not successful because a potential out_of_memory situation could be reached), and prepn_cold (preparation was not completed since the source files are cold).

If the status returned by the preparation phase is prepn_true, it means that the associated source files could be opened and the inlines can proceed. If the status is prepn_out_of_memory, it means that a hold state has been reached. Some files need to be closed before this inline can proceed. In this case, StatusHandler is called. If the status returned by the preparation phase is prepn_cold, it means that the associated source files are considered cold and hence will not be opened at this point. In this scenario, the next edge in the inline affinity graph is examined.

StatusHandler is called when inlines cannot proceed in the current situation. StatusHandler usually closes some files and opens others in order to allow inlines to proceed. This routine is described in more detail later.

After every inline, the affinity graph and the dependence graph are updated. The inline affinity graph is updated by reducing the weight of the corresponding edge. The dependence graph is implicitly updated. This means that the dependence test from edge x to edge y always checks first whether y is already inlined. If yes, there is effectively no dependence from edge x to edge y.

The iterative process continues while there are remaining inlines to be performed. When the weights of all the edges in the inline affinity graph reach zero, all inlines have been done.

Code Segment 9

```
// This is the top-level inline transformation driver and works on the inline
// affinity and dependence graph
PerformTransform(affinity_graph, dependence_graph)
{
    // Given an affinity graph, choose an edge that should lead to
    // the maximum number of inlines without opening any new files
    current_ag_edge = ChooseBestEdge(affinity_graph)
    while (inlines remaining)
    {
        //Process the current edge (corresponding to 2 source files)
        while (current_ag_edge)
        {
            current_ag_src = GetSource(current_ag_edge)
            current_ag_dst = GetDestination(current_ag_edge)
        // Given the source files corresponding to current_ag_src and
        //current_ag_dst,
prepare for inline by checking the current //situation
            prepn_status = Prepare ForInline(current_ag_src,
                current_ag_dst)
        // Trying to handle the concerned 2 files causes a potential
        out-of-// memory
situation, so some open files need to be closed
            if (prepn_status is prepn_out_of_memory) break
        // Preparation for inline returned an ok status, so inlines can
        //proceed . . . Inline
edges without dependences from the concerned 2 // source files
            prepn_status =
            InlineEdgesWoDependence(current_ag_src)
        // Could all inlines of edges without dependences complete? If
        not, call
StatusHandler
            if (prepn_status is prepn_out_of_memory) break
            current_ag_edge = ChooseBestEdge(affinity_graph)
        }
        // Perform all possible inlines in the open files
        InlineEdgesInOpenFiles( )
        // Handle potential out-of-memory situation by open, write,
        or close of
        // source files as necessary
        HandleOutOfMemory( )
        // After every inline, the affinity graph and the dependence
        graph are //updated.
        The inline affinity graph is updated by reducing the weight
        of //the corresponding
        edge. The dependence graph is implicitly updated. //This
        means that the
        dependence test from edge x to edge y always //checks first
        whether y is already
        inlined. If yes, there is effectively no //dependence from
        edge x to edge y.
    }
}
// Given an affinity graph, this routine returns the next candidate
edge to be examined
ChooseBestEdge(affinity_graph)
{
    Select the edge with the highest weight among the edges in the
    affinity graph
}
// This routine handles out of memory situation
HandleOutOfMemory(current_ag_caller, current_ag_callee)
{
    // Close source files until current source files can be opened
    while (true)
```

-continued

Code Segment 9

```
    {
        is_caller_open = isOpen(current_ag_caller)
        is_callee_open = isOpen(current_ag_callee)
        if (is_caller_open and is_callee_open) break
        prepn_status = PrepareForInline(current_ag_caller,
        current_ag_callee, final)
        if (prepn_status is status_ok) break
        else if (prepn_status is status_out_of_memory)
            CloseFiles( )
    }
}
PrepareForInline(caller, callee)
{
    if (caller or callee source file is currently not open)
    {
        prepn_status = CheckFiles(caller, callee)
        if (prepn_status != status_ok)
            return prepn_status
        OpenFile(caller)
        OpenFile(callee)
        return status_ok
    }
}
bool CheckFiles(caller, callee)
{
    caller_file = GetFile(caller)
    callee_file = GetFile(callee)
    if (caller_file is not yet opened)
    {
        total_file_size += caller_file_size
        total_open_files ++
    }
    if (total_file_size > max_size or total_open_files >
    max_open_files)
        return prepn_out_of_mem
    if (callee_file is not yet opened)
    {
        total_file_size += callee_file_size
        total_open_files ++
    }
    if (total_file_size > max_size or total_open_files >
    max_open_files)
        return prepn_out_of_mem
    return prepn_ok
}
```

The utility routine, PrepareForInline, checks whether the caller and callee files can be opened immediately by calling CheckFiles. If the prepn_status returned by CheckFiles is prepn_ok, the caller and callee files are opened and PrepareForInline returns prepn_ok.

When a hold state is reached, there are potentially opportunities for more inlines before some files are closed. Let us consider the main loop in the top-level driver. As long as a hold state is not reached, our greedy approach completes inlines of as many independent edges as possible. However, earlier dependences may get removed as more and more independent edges are inlined. Consider the following simple dependences: a depends on b but b is independent. Given a certain inline affinity graph, the call site a may be examined for inline transformation before the call site b. However, when a is examined, it depends on b and so the call site a cannot be inlined. Later on, the call site b is examined and is inlined since it is independent. This immediately makes a independent as well. Thus inlines can open up more opportunities for inlining with the current pool of open files by making call sites independent that were earlier dependent on other call sites. This is why the top-level driver, PerformTransform, calls InlineEdgesInOpenFiles in order to catch these opportunities.

InlineEdgesInOpenFiles has two broad phases. It first inlines the call sites that have no dependences and reside in open files. Next, it tries to inline call sites, if possible, that have dependences but reside in open files. This second phase is now described in more detail.

Figure 12:
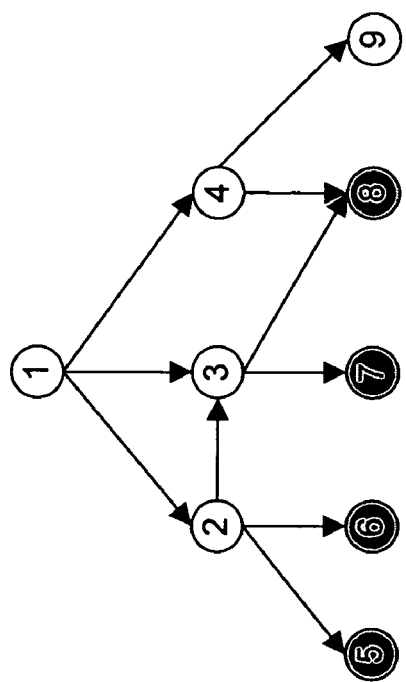

Consider the edge dependence graph shown in FIG. 12, where the nodes represent the call sites and an edge from node x to node y denotes a dependence from call site x to call site y. The nodes, 5, 6, 7, and 8, represent independent call sites and are represented by shaded circles in FIG. 12. So these are immediately inlined. There are at least 2 ways this scenario could be handled. First, it could be handled by an iterative process where, in every iteration the independent call sites are inlined and the iterations continue as long as there is an inline done in the last iteration. While this scheme would catch all possible inlines within the pool of open files, this may take a long compilation time. Hence, our embodiment of the invention chooses a method where potentially some inlines may get missed but our scheme is faster than the previous one. Considering FIG. 12, this is how our scheme will proceed in a possible traversal of the edge dependence graph. The scheme starts by examining call site 1. Call site 1 is dependent on call sites 2, 3, and 4. So before call site 1 can be inlined, call sites 2, 3, and 4 need to be examined. In a possible traversal of the edge dependence graph, call site 2 is examined next. Since call site 2 is dependent on call site 3 and the latter has not yet been inlined, call site 2 cannot yet be inlined. Next, call site 3 is examined and can be immediately inlined since the call sites 7 and 8, on which it depends, have already been inlined. Next, call site 4 is examined. Since call site 9, on which it depends, has not yet been inlined, call site 4 cannot be immediately inlined. Thus, among call sites 2, 3, and 4, only call site 3 gets immediately inlined. Since call sites 2 and 4 are not immediately inlined, call site 1 cannot be immediately inlined. Thus, this process recursively examines the nodes in the edge dependence graph for immediate inline transforms. It is to be noted that if an iterative process were followed, call site 2 could get inlined after inlining call site 3. However, this iterative process will, in general, be slower than the scheme we chose to follow.

CloseFiles is a utility routine that is used to maintain a set of files from which files will be closed. CurrentErasedFileSet is a set of files that have been selected for closing at a certain point of time. If it is non-empty, then the first one is closed. Otherwise, files that are not hot are closed. If a file has not been modified, it is considered unwritten and is added to CurrentErasedFileSet. If a file is considered cold, it is added to CurrentErasedFileSet. A number of criteria can be used to determine whether a file is cold. An example of a cold file is one in which all necessary inlines have been performed.

Code Segment 10

```
InlineEdgesInOpenFiles( )
{
    // Scan the open files looking for edges that have no dependences
    and that can be
    // inlined by using the currently open files
    for (curr_file = MapOpenFileSummary.begin( );
        curr_file != MapOpenFileSummary.end( ); ++ curr_file)
            InlineEdgesWoDep(curr_file)
    // Now scan the open files looking for edges that have dependences
    and that can
    // be inlined by using the currently open files
    for (curr_file = MapOpenFileSummary.begin( );
        curr_file != MapOpenFileSummary.end( ); ++ curr_file)
            InlineEdgesWDep(curr_file)
}
CloseFiles( )
{
    // Close a minimum number of files
    // If there are some files in the CurrentErasedFileSet, pick the first
```

Code Segment 10 -continued

```
    and close it
    if (CurrentErasedFileSet is not empty)
    {
        Pick the first file from CurrentErasedFileSet
        Adjust CurrentOpenSize
        RewriteAndCloseFile(first file)
        return
    }
    Clear the CurrentColdFileSet
    count_closed_files = CollectUnwrittenFiles( )
    if (count_closed_files < CloseThreshold)
        count_closed_files += CollectColdFiles( )
    if (count_closed_files < CloseThreshold)
        CollectRandomFiles(count_closed_files)
}
integer CollectUnwrittenFiles( )
{
    Iterate through all the open files and collect those that are not
    dirty
    Add these to CurrentColdFileSet
    Return count of the above
}
integer CollectColdFiles( )
{
    for (all open files)
        if (current open file does not have any inlines left)
            Add to CurrentColdFileSet
    Return count of the above
}
CollectRandomFiles(count)
{
    Collect (CloseThreshold - count) files randomly from the list of open
    files and add them
    to CurrentColdFileSet
}
bool InlineEdgesWoDep(caller_file, open_file_if_required)
{
    status = true
    // Now iterate through the edges in the inline affinity graph for
    which the caller
    // resides in the caller_file
    for (all call-graph edges having callers in the caller_file)
    {
        if (curr_edge already inlined) continue
        if (curr_edge has no dependence)
        {
            if (open_file_if_required)
            {
                is_prepared = PrepareForInline(caller_file,
                callee_file)
                if (is_prepared != status_ok)
                {
                    status = false
                    continue
                }
            }
            else if (callee of curr_edge resides in an open file)
                TransformCallSite(curr_edge)
        }
    }
}
InlineEdgesWDep(caller_file, done)
{
    // Iterate through all the edges in the inline affinity graph that
    have the callers in
    // the caller_file
    for (all call graph edges having callers in the caller_file)
    {
        if (curr_edge is already inlined) continue
        if (curr_edge does not have a dependence) continue
        InlineEdgesRecursiveDep(curr_edge, done)
    }
}
bool InlineEdgesRecursiveDep(curr_edge, done)
{
    if (done[curr_edge]) return false
    done[curr_edge] = true
    for (all edges that curr_edge depends on)
```

Code Segment 10

```
{
    curr_dep_edge = An edge that curr_edge depends on
    if (!InlineEdgesRecursiveDep(curr_dep_edge, done)
        return false
}
if (callee of curr_edge does not reside in an open file)
    return false
TransformCallSite(curr_edge)
return true
}
```

We implemented alternate schemes that do not attempt to dynamically change the order of inlines depending on the input/output pressure. Instead, whenever a file needs to be closed, a lookahead is employed in order to choose the file to close. The lookahead is intended to detect which files will be required for the next n inlines, where n is a tunable parameter. These files are considered hot and if possible, they are not closed. We present results for this scheme, LookAhead-Scheme, as well. As these results will show, this scheme is an improvement over a scheme which does not perform inline ordering or employ lookahead. However, LookAhead-Scheme incurs much more I/O pressure compared to our main scheme and hence takes much more compile-time. Hence, the scheme which employs both inline reordering and lookahead is the best. Here are some performance results that show the number of rewrites (as a percentage of the number of files that are involved in cross file inlining) that were performed by the two schemes while inlining. A rewrite is incurred when a file that is dirty needs to be written from memory to disk in order to allow other files to be opened. We measure the number of rewrites since this is the most expensive operation during inline transformation. It is critical to be able to keep the rewrites to a minimum in order to achieve compile-time scalability. Clearly, the dynamic reordering scheme performs much better than the lookahead scheme. The results are reported for SPEC2000 integer benchmark programs. The results are obtained by making the assumption that a maximum of 20 files can be opened simultaneously at a certain point of time. The figures in Table 5 denote the number of rewrites as a percentage of the files involved in cross-module inlining. Hence, lower is better.

TABLE 5

| Benchmark | Dynamic ordering (%) | LookAhead (%) |
| --- | --- | --- |
| 164.gzip | 100 | 100 |
| 175.vpr | 94 | 94 |
| 176.gcc | 292 | 1688 |
| 181.mcf | 77 | 77 |
| 186.crafty | 87 | 87 |
| 197.parser | 94 | 94 |
| 252.eon | 100 | 255 |
| 253.perlbmk | 108 | 134 |
| 254.gap | 111 | 630 |
| 255.vortex | 141 | 851 |
| 256.bzip2 | 100 | 100 |
| 300.twolf | 94 | 190 |

As described above, in accordance with one embodiment of the invention, the inline analysis phase generates a list of call sites that need to be inlined in a certain order. However, this order generated by the analysis phase may not be the best one for minimizing file thrashing. One part of the invention computes the dependences among these call sites signifying the ordering relationships that absolutely need to be maintained. This immediately brings out call sites that are independent and can be inlined in any arbitrary order. According to an embodiment of the invention, a relationship among the files is constructed on the basis of where the caller and the callee routines reside. An affinity factor is computed between the source files. Depending on the affinity factor between files and the dependences among call sites requiring inlines, an ordering of inlinable call sites is generated with a view to minimize the thrashing of files (write, opens, closes). This ordering is likely very different from what the inline analyzer generated. One aspect of the invention lies in the computation of the dependences among the call sites. A framework is provided to capture the dependences in such a way so as to capture the best run-time performance while not constraining the dynamic ordering generation algorithm.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of compiling a computer program, the method comprising:
   receiving a plurality of modules of source code;
   generating intermediate representations corresponding to the modules;
   extracting a set of data from the intermediate representations to create an inliner summary for each module;
   using the inliner summaries and a globally-sorted working-list based order in an inline analysis phase, without using the intermediate representations in the inline analysis phase, to determine which call sites in the modules are to be inlined by substituting code from a called module, wherein said globally-sorted working-list based order is dynamically updated during the inline analysis phase; and
   after a call site is determined to be inlined, updating a call graph of the routines and call sites, and updating the inliner summaries throughout the call graph,
   wherein determining the call sites to be inlined involves proceeding only once through the call sites in said dynamically-updated globally-sorted working-list based order.

2. The method of claim 1, further comprising, after the call graph and inliner summaries are updated,
   re-calculating profitabilities associated with remaining call sites; and
   re-ordering the working list using the re-calculated profitabilities.

3. The method of claim 2, wherein updating the inliner summaries comprises determining nodes and edges of the call graph that are affected by the inlining of the call site and updating those inliner summaries corresponding to the affected nodes and edges.

4. The method of claim 3, wherein the edge summaries include at least a call site execution count and a signature type.

5. The method of claim 3, wherein the node summaries include at least a code size, a routine execution count, and a call-graph height.

6. The method of claim 1, wherein the inline analysis phase is separate and distinct from an inline transformation phase.

7. An apparatus for compiling a computer program, the apparatus comprising:
   a processor configured to execute computer-readable code;
   a memory system configured to store data;
   computer-readable code for a front-end portion of a compiler program, the front-end portion of the compiler program being configured to receive a plurality of modules of source code, generate intermediate representations corresponding to the modules, and extract a set of data from the intermediate representations to generate inliner summaries for the modules; and
   computer-readable code for a cross-module optimizer of the compiler program, the cross-module optimizer being configured to use the inliner summaries and a dynamically-updated globally-sorted working-list based order to analyze the call sites in an inline analysis phase, without using the intermediate representations, so as to determine which call sites in the modules are to be inlined by substituting code from a called module, and to update a call graph of the routines and call sites, and to update the inliner summaries, after a call site is determined to be inlined, wherein determining the call sites to be inlined involves proceeding only once through the call sites in said dynamically-updated globally-sorted working-list based order.

8. The apparatus of claim 7, wherein the cross-module optimizer is further configured to re-calculate profitabilities associated with remaining call sites, and re-order the working list using the re-calculated profitabilities, after the call graph and inliner summaries are updated.

9. The apparatus of claim 8 wherein the cross-module optimizer is further configured to update the inliner summaries by determining nodes and edges of the call graph that are affected by the inlining of the call site and update those inliner summaries corresponding to the affected nodes and edges.

10. The apparatus of claim 9, wherein the edge summaries generated by the front-end portion include at least a call site execution count and a signature type.

11. The apparatus of claim 9, wherein the node summaries generated by the front-end portion include at least a code size, a routine execution count, and a call-graph height.

12. The apparatus of claim 7, wherein the cross-module optimizer is further configured to perform the inline analysis phase separately and distinctly from an inline transformation phase.

13. A computer program product comprising a computer-usable medium having computer-readable code embodied therein, the computer program product being compiled from a plurality of modules of source code using inliner summaries and a dynamically-updated globally-sorted working-list based order in an inline analysis phase, without using intermediate representations, to determine which call sites in the modules are to be inlined by substituting code from a called module and, after a call site is determined to be inlined, to determine a call graph of the routines and call sites, and to update the inliner summaries throughout the call graph, wherein determining the call sites to be inlined involves proceeding only once through the call sites in said dynamically-updated globally-sorted working-list based order.

14. A method of compiling a computer program with a plurality of modules of source code and corresponding intermediate representations, the method comprising:
   extracting a set of data from the intermediate representations of the modules to create an inliner summary for each module;
   using the inliner summaries in a one-pass inline analysis phase, without using the intermediate representations, to determine which call sites to inline, in what order to inline them, and preserving a same order during the transformation phase;
   formulating a measure of goodness for each call site from the inliner summary;
   using a technique to dynamically update information in the summary for potentially all call-graph nodes and edges every time a call site is accepted for inlining; and
   using a globally sorted work-list and an associated table to maintain and manipulate the call sites and dynamically updating the work-list every time a call site is accepted for inlining.

15. The method of claim 14, wherein the inliner summaries are comprised of: a code size; a call site profile count; a critical path length; an execution time; a node level; a level criticality; and a total execution count.

16. The method of claim 14, wherein an arbitrary inlining order among the call sites in the call graph is selectable in an inline analysis phase, and wherein that same order is followed in an inline transformation phase.

17. The method of claim 14, wherein a measure of goodness for each call site is computed from the light-weight inliner summary, and a total profit is computed as a product of component profit factors, and a total cost is computed as a product of component cost factors.

18. The method of claim 14, wherein information in the light-weight inliner summary corresponding to call-graph nodes and edges are updated each time a call site is accepted for inlining, and wherein a goodness factor of each call site with updated summary information is re-computed.

19. The method of claim 14, wherein a globally-sorted work list and an associated table are maintained and used to continuously order the work list and extract a call site with a highest goodness factor.

* * * * *